US007103462B1

United States Patent
Suzuki

(10) Patent No.: US 7,103,462 B1
(45) Date of Patent: Sep. 5, 2006

(54) CONTROL DEVICE OF AUTOMATIC TRANSMISSION

(75) Inventor: Masaru Suzuki, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/359,620

(22) Filed: Feb. 23, 2006

(30) Foreign Application Priority Data

Feb. 28, 2005 (JP) .............................. 2005-052264

(51) Int. Cl.
*G06F 17/00* (2006.01)
*G06G 7/00* (2006.01)
(52) U.S. Cl. .............................. 701/51; 701/55; 701/56
(58) Field of Classification Search .................. 701/51, 701/52, 53, 54, 55, 56, 59, 58, 60, 66, 64; 74/325, 330, 333, 335; 475/43, 60, 116, 475/121, 125
See application file for complete search history.

(56) References Cited

U.S. PATENT DOCUMENTS

| 6,929,583 B1* | 8/2005 | Ayabe et al. ................. 477/109 |
| 6,931,315 B1* | 8/2005 | Ayabe et al. ................. 701/59 |
| 6,950,736 B1* | 9/2005 | Cho ............................. 701/62 |
| 6,955,629 B1* | 10/2005 | Nishida et al. .............. 477/143 |
| 6,961,647 B1* | 11/2005 | Matsumura et al. .......... 701/55 |
| 6,996,861 B1* | 2/2006 | Clark, Jr. ........................ 4/606 |
| 6,997,837 B1* | 2/2006 | Oshima et al. ............... 475/43 |
| 7,001,299 B1* | 2/2006 | Takagi et al. ................ 475/116 |

FOREIGN PATENT DOCUMENTS

JP  3291970  3/2002

* cited by examiner

*Primary Examiner*—Richard M. Camby
(74) *Attorney, Agent, or Firm*—Nixon & Vanderhye P.C.

(57) ABSTRACT

When a request to switch to a shift to a new third shift step is made during performing a shift from a first shift step to a second shift step, a method of performing the shift to the third shift step is changed according to an engagement pattern of respective friction engaging components in a steady state of the third shift step. When there are the friction engaging components that are continuously being engaged or disengaged at the time of a shift from the second shift step to the third shift step, the friction engaging components are continuously engaged or disengaged whereas the control of engaging or disengaging the other friction engaging components that are to be changed in the state of engagement or disengagement is started so as to make the other friction engaging components respond to the engagement pattern of the third shift step.

7 Claims, 20 Drawing Sheets

| RANGE | CLUTCH | | | BRAKE | | | |
|---|---|---|---|---|---|---|---|
| | C0 | C1 | C2 | B0 | B1 | B2 | B3 |
| P | | O | | | O | | |
| R | | O | | O | O | | |
| N | | O | | | O | | |
| 1 | | O | | | O | O | O |
| 2 | | | O | | O | O | O |
| 3 | | O | O | | O | | O |
| 4 | O | O | O | | | | O |
| 5 | O | O | | | O | | O |

FIG. 20

|  → | REQUESTED SHIFT | | | | |
|---|---|---|---|---|---|
| PRESENT SHIFT ↑ | 1 | 2 | 3 | 4 | 5 |
| 1 |  | 2 | 3 | 3 | 3 |
| 2 | 1 |  | 3 | 3 | 3 |
| 3 | 1 | 2 |  | 4 | 5 |
| 4 | 3 | 3 | 3 |  | 5 |
| 5 | 3 | 3 | 3 | 4 |  |

FIG. 21

|  → | REQUESTED SHIFT | | | | |
|---|---|---|---|---|---|
| TARGET SHIFT ↑ | 1 | 2 | 3 | 4 | 5 |
| 1 |  | 2 | 3 | 3 | 3 |
| 2 | 1 |  | 3 | 3 | 3 |
| 3 | 1 | 2 |  | 4 | 5 |
| 4 | 3 | 3 | 3 |  | 5 |
| 5 | 3 | 3 | 3 | 4 |  |

→ MULTIPLE TARGET SHIFT

| SHIFT | 1 | 2 | 3 | 4 | 5 |
|---|---|---|---|---|---|
| 5→4 | − | − | A, C | | B |
| 4→3 | C | C | | B | A, C |
| 5→3 | C | C | | A, C | B |
| | | | | | |

A: SHIFT CHANGE
B: CANCELLABLE
C: CONTINUOUS PREPARATION
−: NONE

CONTROL DEVICE OF AUTOMATIC TRANSMISSION

CROSS-REFERENCE TO RELATED APPLICATION

This application is based on Japanese Patent Application No. 2005-52264 filed on Feb. 28, 2005, the disclosure of which is incorporated herein by reference.

FIELD OF THE INVENTION

The present invention relates to a control device of an automatic transmission provided with the function of performing multiple shift control when a request to switch to a new shift step is made during the operation of switching a shift step of an automatic transmission.

BACKGROUND OF THE INVENTION

In an automatic transmission for an automobile, the power of an engine is transmitted to the input shaft of a transmission mechanism via a torque converter and the rotation of this input shaft is varied and is transmitted to an output shaft thereof by this transmission mechanism to rotate and drive a driving wheel. In the commonest transmission mechanism, a plurality of gears are arranged between the input shaft and the output shaft to construct a plurality of power transmission paths of different transmission gear ratios between the input shaft and the output shaft and friction engaging components of clutches and brakes are mounted in the respective power transmission paths. By individually controlling hydraulic pressures applied to the respective friction engaging components according to a request to switch a shift step, the filling control of filling specified friction engaging components with hydraulic oil and the draining control of draining the hydraulic oil from specified friction engaging components is performed to selectively switch between engagement and disengagement of the respective friction engaging components to switch the power transmission paths between the input shaft and the output shaft to thereby switch a transmission gear ratio.

In this automatic transmission, when a request to switch to a new shift step is made during the operation of switching a shift step and a target shift step is changed, the multiple shift control of switching a shift step of the transmission mechanism to the target shift step after shift change is performed. For example, the following case is assumed; the filling control of filling the cylinder of a clutch or the like with hydraulic oil is being performed and the filling control is switched in the process of the filling control to the draining control of draining the hydraulic oil by the change of a target shift step and then the draining control is again switched in the process of the draining control to the filling control by the change of a target shift step. In this case, depending on a state where the hydraulic oil is drained from the cylinder by the draining control before shift change, there is a possibility that when the cylinder is again filled with the hydraulic oil, the cylinder is excessively filled with the hydraulic oil to suddenly increase a force for engaging the clutch to cause a shift shock.

As a technology for preventing the shift shock caused by this multiple shift, for example, as disclosed in Japanese Patent No. 32919790, there is proposed a technology that when a request to switch to a second shift step is made during the operation of switching to a first shift step, the operation of switching to the second shift step is delayed until the operation of switching to the first shift step is finished.

However, the operation of switching to the second shift step is delayed until the operation of switching to the first shift step is finished and hence it takes a long time before the operation of switching to the second shift step is finished.

SUMMARY OF THE INVENTION

The present invention has been made in consideration of such circumstances. Therefore, the object of the present invention is to provide such a control device of an automatic transmission that can prevent a shift shock caused by a multiple shift and at the same time can perform a multiple shift with excellent responsivity.

To achieve the above-mentioned object, the present invention is such a control device of an automatic transmission that includes multiple shift controlling means which switches the controlling state of hydraulic pressure applied to respective friction engaging components to perform a multiple shift when a request to switch to a shift to a new third shift step is made during performing a shift from a first shift step to a second shift step. A method for shifting to the third shift step is changed according to a combination pattern of engagement and disengagement (hereinafter referred to as "engagement pattern") of the respective friction engaging components in the steady state of the third shift step. When a request to switch to a shift to a new third shift step is made during performing a shift from a first shift step to a second shift step, it is possible to select an appropriate shifting method and to perform a multiple shift in consideration of the relationship between the engagement pattern of the respective friction engaging components at that time. Hence, it is possible to restrict a shift shock caused by a multiple shift and at the same time to perform a multiple shift with excellent responsivity.

BRIEF DESCRIPTION OF THE DRAWINGS

FIG. 20 is a diagram showing one example of a shift table for setting a target shift step according to a present shift step and a requested shift step.

FIG. 21 is a diagram showing one example of a shift table for setting a multiple target shift step according to a target shift step and a requested shift step.

DETAILED DESCRIPTION OF THE PREFERRED EMBODIMENTS

Figure 1:
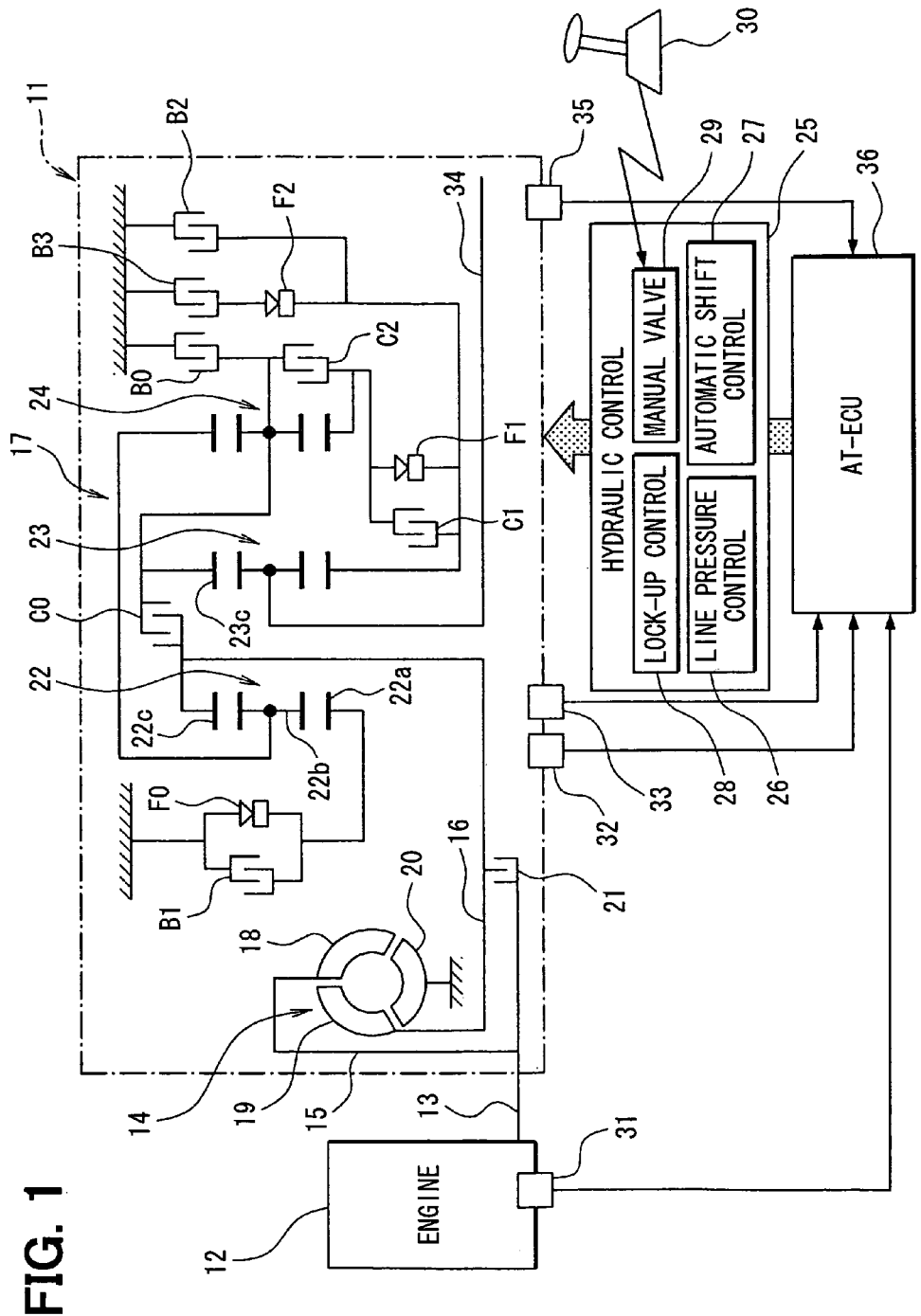
FIG. 1 is a general schematic construction diagram of an automatic transmission in one embodiment of the present invention.

Hereinafter, one embodiment in which the best mode for carrying out the present invention is applied to a five-speed automatic transmission to embody the present invention will be described.

First, the schematic construction of an automatic transmission 11 will be described on the basis of FIG. 1. The output shaft of an engine (driving source) 12 has the input shaft 15 of a torque converter 14 coupled thereto and the output shaft 16 of this torque converter 14 has a hydraulic driving type transmission gear mechanism (transmission mechanism) 17 coupled thereto. In the torque converter 14, a pump impeller 18 and a turbine runner 19, which construct a hydraulic coupling, are opposed to each other and a stator 20 for straightening the flow of oil is interposed between the pump impeller 18 and the turbine runner 19. The pump impeller 18 is coupled to the input shaft 15 of the torque converter 14 and the turbine runner 19 is coupled to the output shaft 16 of the torque converter 14.

Then, the torque converter 14 is provided with a lock-up clutch 21 for engaging or disengaging the input shaft 15 with or from the output shaft 16. The engine 12 has its output torque transmitted to the transmission mechanism 17 via the torque converter 14 and has its rotation speed varied by first to third planetary gear mechanisms 22 to 24 of the transmission gear mechanism 17 and has the output torque transmitted to the driving wheels (front wheels or rear wheels) of a vehicle.

Figures 2, 3:
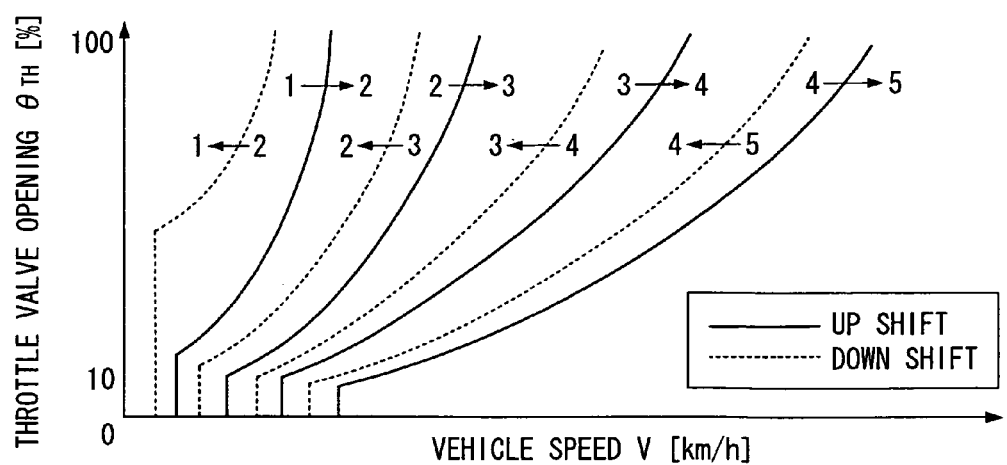
FIG. 2 is a diagram showing a combination of engagement and disengagement of clutches C0 to C2 and brakes B0 to B3 for respective shift steps.
FIG. 3 is a graph showing one example of a shift pattern.

The transmission gear mechanism 17 is provided with a plurality of clutches C0, C1, and C2 and brakes B0, B1, B2, and B3, which are friction engaging components for switching a plurality of shifting steps, and a plurality of one-way clutches F0, F1, and F2. As shown in FIG. 2, by hydraulically engaging and disengaging these clutches C0, C1, and C2 and brakes B0, B1, B2, and B3, a combination of gears of the respective planetary gear mechanisms 22 to 24 for transmitting power is switched to thereby switch a transmission gear ratio.

FIG. 2 shows a combination of engagement of the clutches C0, C1, and C2 and the brakes B0, B1, B2, and B3 of the five-speed automatic transmission and a circular mark shows that the clutch or the brake is held in an engaging state (in a state where torque is transmitted) in that transmission step and no mark shows that the clutch or the brake is held in a disengaging state. For example, when a downshift from the third speed to the second speed is performed, one clutch C1 of the clutches C1, C2 and the brakes B1, B3 which are held in an engaging state at the third speed is disengaged and the brake B2 is engaged instead to perform a downshift to the second speed. When an upshift from the third speed to the fourth speed is performed, one brake B1 of the clutches C1, C2 and the brakes B1, B3 which are held in an engaging state at the third speed is disengaged and the clutch C0 is engaged instead to perform an upshift to the fourth speed.

As shown in FIG. 1, the transmission gear mechanism 17 is provided with a hydraulic pump (not shown) driven by the power of the engine 12 and an oil pan (not shown) for storing hydraulic oil is provided with a hydraulic control circuit 25. This hydraulic control circuit 25 is constructed of a line pressure control circuit 26, an automatic shift control circuit 27, a lock-up control circuit 28, and a manual switching valve 29. Hydraulic oil sucked from the oil pan by the hydraulic pump is supplied to the automatic shift control circuit 27 and the lock-up control circuit 28 via the line pressure control circuit 26. The line pressure control circuit 26 is provided with a hydraulic control valve (not shown) for controlling a hydraulic pressure from the oil pump to a specified line pressure. The automatic shift control circuit 27 is provided with a plurality of hydraulic control valves (not shown) for shifting for controlling hydraulic pressures applied to the respective clutches C0, C1, and C2 and the respective brakes B0, B1, B2, and B3 of the transmission gear mechanism 17. The lock-up control circuit 28 is provided with a hydraulic control valve for lock-up control for controlling a hydraulic pressure applied to the lock-up clutch 21.

Moreover, the manual switching valve 29 that is switched in connection with the operation of a shift lever 30 is interposed between the line pressure control circuit 26 and the automatic shift control circuit 27. In a case where the shift lever 30 is operated in a neutral range (N range) or in a parking range (P range), even when the passage of current through the hydraulic control valve of the automatic shift control circuit 27 is stopped (OFF), the hydraulic pressure applied to the transmission gear mechanism 17 is switched by the manual switching valve 29 so as to bring the transmission gear mechanism 17 to a neutral state.

Meanwhile, the engine 12 is provided with a throttle position sensor 31 for detecting a throttle position. Then, the transmission gear mechanism 17 is provided with a rotational speed sensor 32 for detecting the rotational speed of the sun gear 22$a$ of a first planetary gear mechanism 22, a rotational speed sensor 33 for detecting the rotational speed of the carrier 22$b$ of the first planetary gear mechanism 22, and an output shaft rotational speed sensor 35 for detecting the rotational speed of the output shaft 34 of the transmission gear mechanism 17.

The output signals of these various sensors are inputted to an automatic transmission electronic control unit (hereinafter referred to as "AT-ECU") 36. This AT-ECU 36 is mainly constructed of a microcomputer and performs various programs for shift control stored in a built-in ROM (storage medium) to vary the speed of the transmission gear mechanism 17 according to a previously set shift pattern as shown in FIG. 3. That is, the AT-ECU 36 controls the passage of current through the respective hydraulic control valves of the automatic shift control circuit 27 according to a shift step switching request (request to switch a target shift step) made according to the operating position of the shift lever 30 and driving conditions (throttle position, vehicle speed, and the like) to thereby control hydraulic pressures applied to the respective clutches C0, C1, and C2 and the respective brakes B0, B1, B2, and B3 of the transmission gear mechanism 17. With this, as shown in FIG. 2, the switching between engagement and disengagement of the respective clutches C0, C1, and C2 and the respective brakes B0, B1, B2, and B3 is done to switch the combination of gears of the respective planetary gear mechanisms 22 to 24 for transmitting power, whereby the transmission gear ratio of the transmission gear mechanism 17 is switched. When a request to switch to a new shift step is made during switching the shift step of the transmission gear mechanism 17 and a requested shift step is switched to a new target shift step, the AT-ECU 36 performs the multiple shift control of switching the shift step of the transmission gear mechanism 17 to the new target shift step.

In the multiple shift control of this embodiment, when a request to switch to a shift to a new third shift step is made during performing a shift from a first shift step to a second shift step, a method for shifting to the third shift step is changed in the following manner according to the combination pattern of engagement and disengagement (hereinafter referred to as "engagement pattern") of the respective friction engaging components (the respective clutches C0, C1, and C2 and the respective brakes B0, B1, B2, and B3) in the steady state of the third shift step.

(1) When there are the friction engaging components that are continuously engaged or disengaged at the time of a shift from the second shift step to the third shift step (for example, when a request to switch to a shift to the third speed during performing a shift from the fifth speed to the fourth speed, or when a request to switch to a shift to the second speed during performing a shift from the fourth speed to the third speed), the control of engaging or disengaging the friction engaging components is continued, whereas the control of engaging or disengaging the other friction engaging components, which are to be changed in the state of engagement or disengagement, is started so as to make the other friction engaging components respond to the engagement pattern of the third shift step to thereby move to the shift from the second shift step to the third shift step.

(2) When all of the friction engaging components that are to be switched between engagement and disengagement at the time of the shift from the first shift step to the second shift step are different from the friction engaging components that are to be switched between engagement and disengagement at the time of the shift from the second shift step to the third shift step (for example, a request to switch to a shift to the second speed during performing a shift from the fourth speed to the third speed), the control of engaging or disengaging the friction engaging components to achieve an engagement pattern of the second shift step is continued and at the same time the applying of hydraulic pressures to the friction engaging components relating to the engagement pattern of the third shift step is prepared so as to bring about a state just before being able to achieve the engagement and disengagement of the friction engaging components before finishing the shift to the second shift step.

(3) When the engagement pattern of the third shift step is the same as the engagement pattern of the first shift step (for example, a request to switch to a shift to the fifth speed during performing a shift from the fifth speed to the fourth speed), the friction engaging component that is to be switched to being engaged is disengaged and the friction engaging component that is to be switched to being disengaged is engaged during performing the shift from the first shift step to the second shift step to thereby cancel the above-mentioned shift to the second shift step.

(4) As the temperature of hydraulic oil becomes lower, the fluidity of the hydraulic oil becomes lower and hence the responsivity of hydraulic control becomes lower and hence progress in shifting to the respective steps becomes slower. Therefore, when the temperature of the hydraulic oil becomes too low, there is a possibility that the responsivity of hydraulic control is not sufficient for performing the above-mentioned multiple shift control. When a change in the rotational speed of the input shaft to the second shift step is already started at the time when a request to switch to the shift to the third shift step is made, it is difficult to perform the above-mentioned multiple shift control.

Hence, when the request to switch to the shift to the third shift step is detected, it is determined whether or not a first prohibiting condition holds by whether or not the temperature of the hydraulic oil of the automatic transmission is lower than a first previously specified value or by whether or not the degree of progress in the shift to the second shift step reaches a specified value. When it is determined that the first prohibiting condition holds, the shift to the third shift step, which has been described in (1), is not performed and/or the canceling of the shift to the second shift step, which has been described in (3), is not performed, but the applying of hydraulic pressures to the friction engaging components relating to the engagement pattern of the third shift step is prepared so as to bring about a state just before being able to achieve the engagement and disengagement of the friction engaging components before finishing the shift to the second shift step.

(5) When the request to switch to the shift to the third shift step is detected, it is determined whether or not a second prohibiting condition holds by whether or not the temperature of the hydraulic oil of the automatic transmission is lower than a second specified value that is set at a value lower than the first specified value. When it is determined that the second prohibiting condition holds, the shift to the third shift step is not performed until the shift to the second shift step is finished (in other words, the shift to the third shift step is performed after the shift to the second shift step is finished).

Next, specific examples of the multiple shift control of the present embodiment will be described by the use of a time chart shown in FIG. 4 to FIG. 7.

Figure 4:
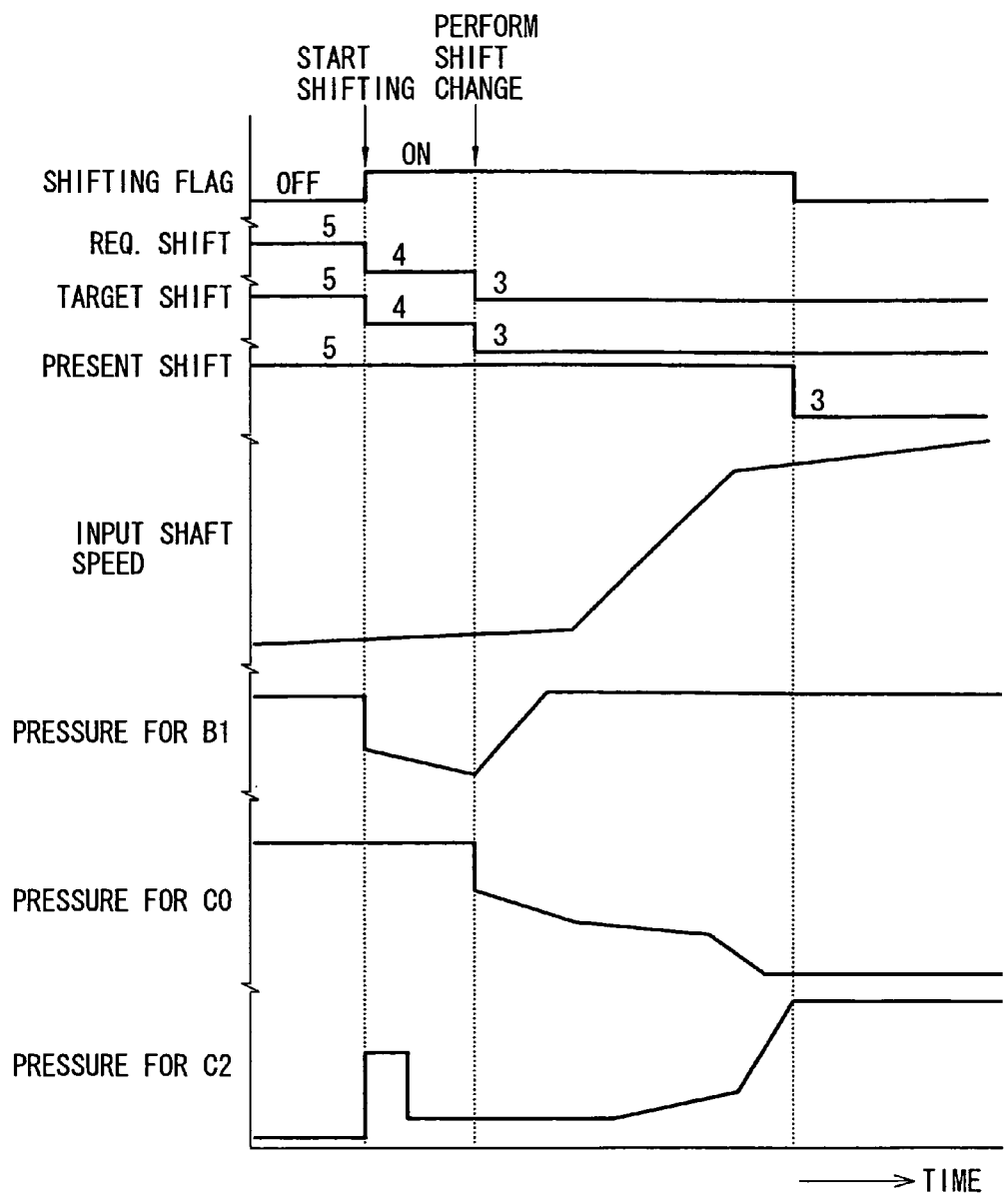
FIG. 4 is a time chart showing a control example (shift change) when a request to switch a shift to a third speed is made during performing a shift from a fifth speed to a fourth speed.

FIG. 4 is a time chart showing a control example (shift change) when a request to switch to a shift to the third speed is made during performing a shift from the fifth speed to the fourth speed. As shown in the engagement table in FIG. 2, when the shift from the fifth speed to the fourth speed is performed, the clutches C0, C1 and the brake B3 are continuously engaged and the brakes B0, B2 are continuously disengaged, whereas the clutch C2 is switched from being disengaged to being engaged and the brake B1 is switched from being engaged to being disengaged. Meanwhile, when a shift from the fifth speed to the third speed is performed, the clutch C1 and the brakes B1, B3 are continuously engaged and the brakes B0, B2 are continuously disengaged, whereas the clutch C2 is switched from being disengaged to being engaged and the clutch C0 is switched from being engaged to being disengaged. Hence, when the request to switch to the shift to the third speed is made during performing the shift from the fifth speed to the fourth speed, the control of engaging the clutch C2 is continued and the control of disengaging the brake B1 is stopped, but the control of disengaging the clutch C0 is started instead. With this, the shift change of shifting from the fifth speed to the third speed is performed to perform a shift to the third speed which is a requested shift step (third shift step).

Figure 5:
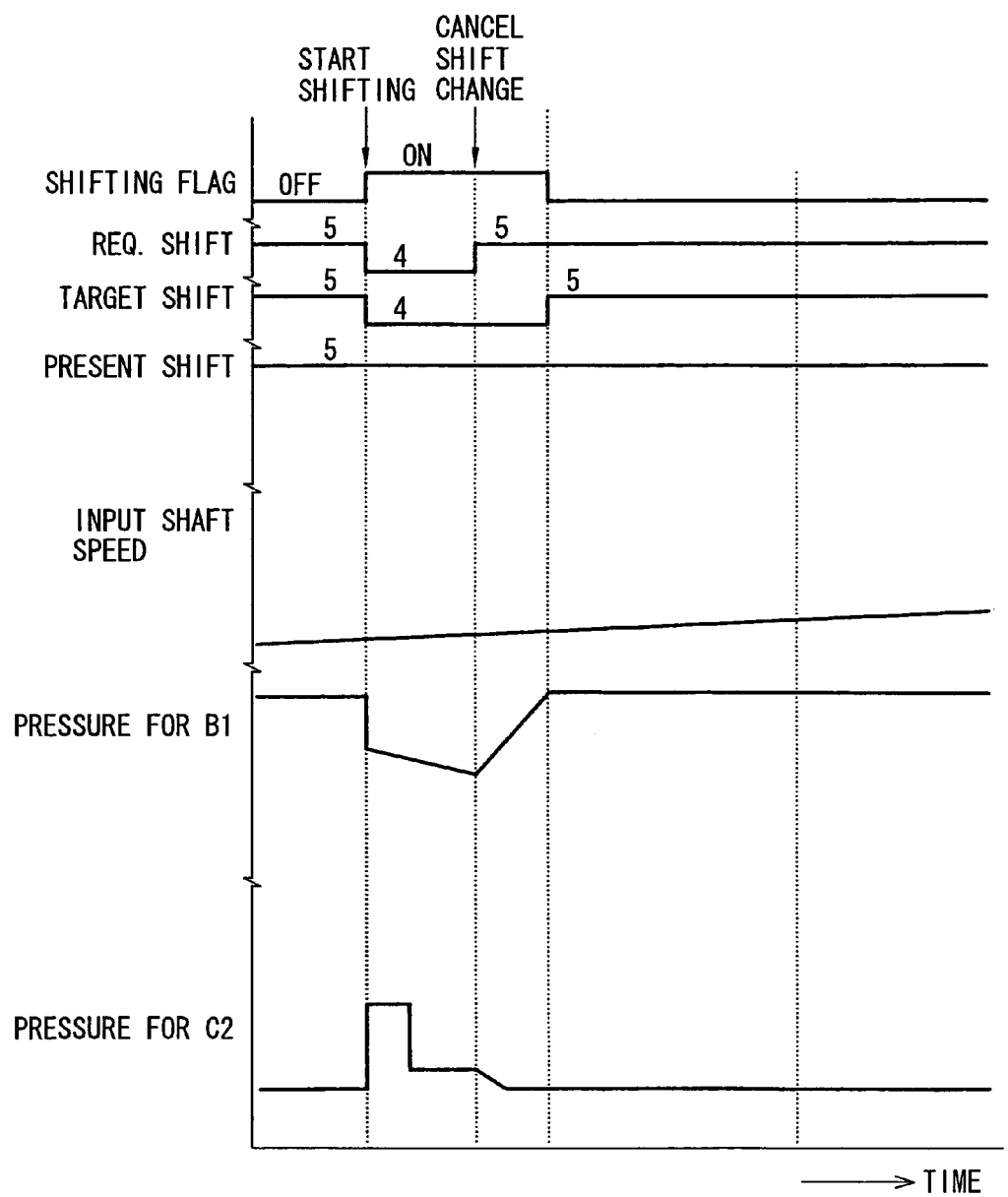
FIG. 5 is a time chart showing a control example (shift cancellation) when a request to switch a shift to a fifth speed is made during performing the shift from the fifth speed to the fourth speed.

FIG. 5 is a time chart showing a control example (shift cancellation) when a request to switch to a shift to the fifth speed is made during performing the shift from the fifth speed to the fourth speed. In this case, because the third shift step (fifth speed) is the same as the first shift step (fifth speed), during performing the shift to the fourth speed, the clutch C2 that is a friction engaging component that is to be switched to being engaged is disengaged and the brake B1 that is a friction engaging component that is to be switched to being disengaged is engaged. With this operation, the shift to the fourth speed, which is the second shift step, is cancelled and the shift to the fifth speed, which is the requested shift step (third shift step), is performed.

Figure 6:
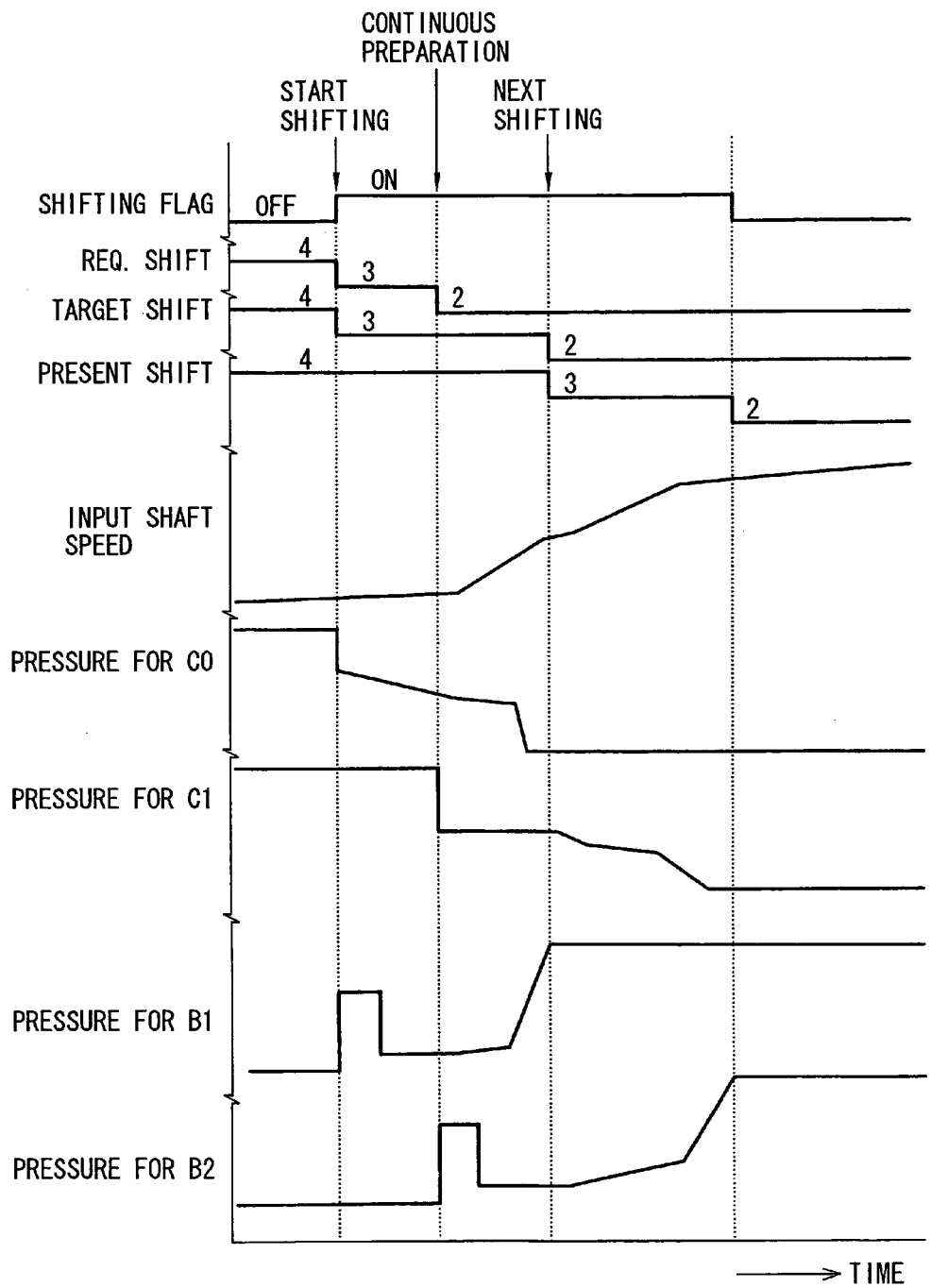
FIG. 6 is a time chart showing a control example (continuous shift preparation) when a request to switch a shift to a second speed is made during performing a shift from the fourth speed to the third speed.

FIG. 6 is a time chart showing a control example (continuous shift preparation) when a request to switch to a shift to the second speed is made during performing a shift from the fourth speed to the third speed. When the shift from the fourth speed to the third speed is performed, as shown in the engagement table in FIG. 2, the clutches C1, C2 and the brake B3 are continuously engaged and the brakes B0, B2 are continuously disengaged, whereas the clutch C0 is switched from being disengaged to being engaged and the brake B1 is switched from being engaged to being disengaged. Meanwhile, when a shift from the third speed to the second speed is performed, the clutch C2 and the brakes B1, B3 are continuously engaged and the clutch C0 and the brake B0 are continuously disengaged, whereas the brake B2 is switched from being disengaged to being engaged and the clutch C1 is switched from being engaged to being disengaged. Hence, when the request to switch to the shift to the second speed is made during performing the shift from the fourth speed to the third speed, different clutches and brakes are controlled between the shift from the fourth speed to the third speed and the shift from the third speed to the second speed. Therefore, when the request to switch to the shift to the second speed is made during performing the shift from the fourth speed to the third speed, to continuously perform the shift from the third speed to the second speed while performing the shift from the fourth speed to the third speed, the preparation control of engaging the brake B2 and disengaging the clutch C1 (control of preparing hydraulic pressures applied to the brake B2 and the clutch C1 so as to bring about a state just before being able to achieve engagement and disengagement) is performed and waits until the shift from the fourth speed to the third speed is finished. Then, immediately after the shift from the fourth speed to the third speed is finished, the hydraulic control of the brake B2 and the clutch C1 is performed to thereby perform a shift to the second speed which the requested shift step (third shift step).

Figure 7:
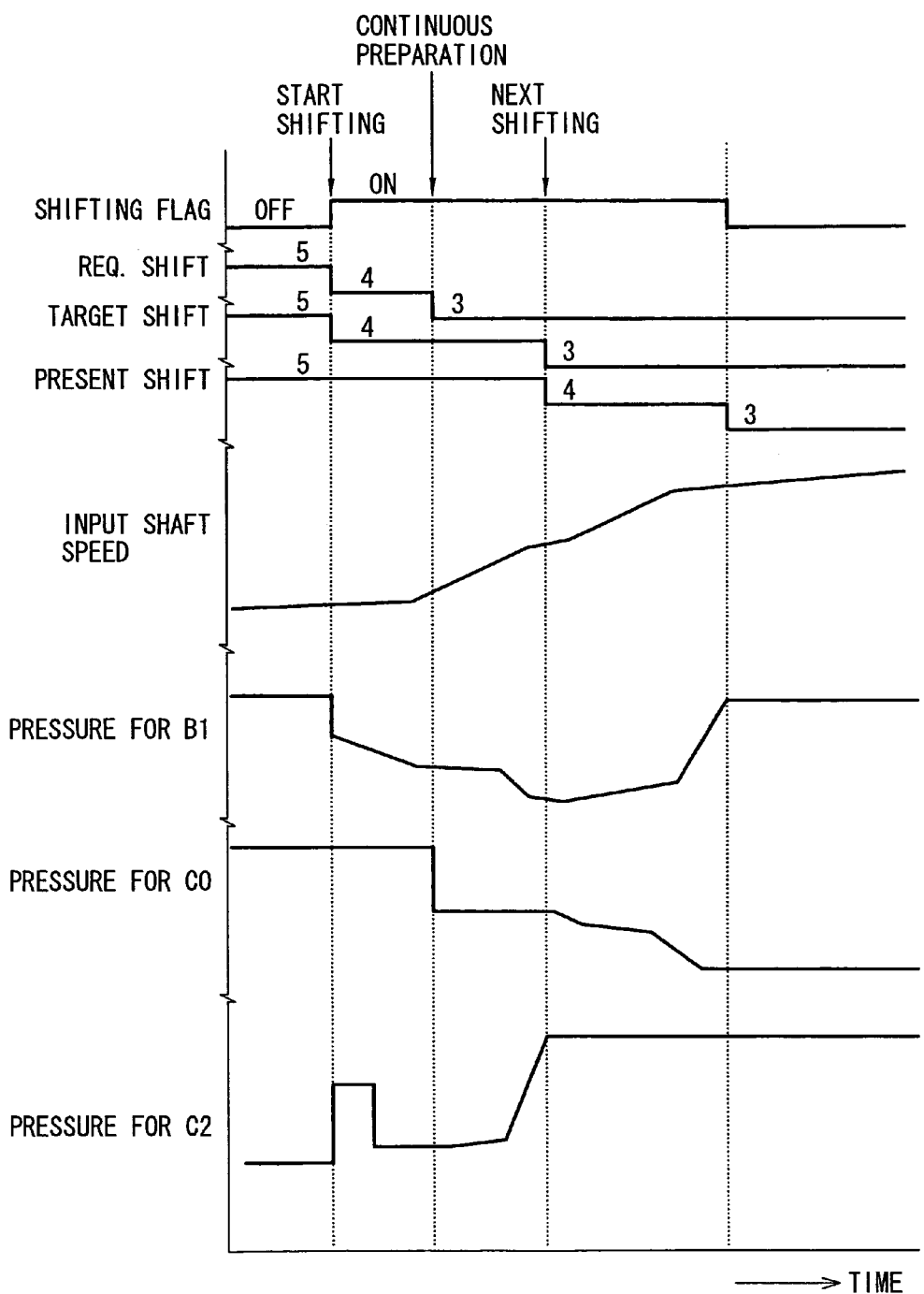
FIG. 7 is a time chart showing a control example (continuous shift preparation) when a request to switch a shift to the third speed is made after a change in the rotational speed of an input shaft is started during performing the shift from the fifth speed to the fourth speed.

FIG. 7 is a time chart showing a control example (continuous shift preparation) when a request to switch to a shift to the third speed is made after a change in the rotational speed of the input shaft is started during performing the shift from the fifth speed to the forth speed. After the control of the shift from the fifth speed to the fourth speed is started and then a change in the rotational speed of the input shaft is started, a change in the rotation of the input shaft is controlled by a component that is to be disengaged and hence it is difficult to make a shift change to shift from the fifth speed to the third speed as shown in FIG. 4. Hence, in this case, the shift from the fifth speed to the fourth speed is continued and preparation for performing a shift from the fourth speed to the third speed in succession is performed. That is, the following case is assumed; the request to switch to the shift to the third speed is made after the change in the rotation of the input shaft is started while the control of engaging the clutch C2 and disengaging the brake B1 is performed so as to perform the shift from the fifth speed to the fourth speed. In this case, the control of the shift from the fifth speed to the fourth speed is continued and at the same time the preparation of disengaging the clutch C0 as the preparation of the shift from the fourth speed to the third speed (control of preparing a hydraulic pressure applied to the clutch C0 so as to bring about a state just before disengaging the clutch C0) is performed and then waits until the shift from the fifth speed to the fourth speed is finished. Then, immediately after the shift from the fifth speed to the fourth speed is finished, the control proceeds to the shift from the fourth speed to the third speed to engage the brake B1. However, this brake B1 is subjected to the disengaging control in the shift from the fifth speed to the fourth speed and hence the preparation of engaging the brake B1 is not performed during performing the shift from the fifth speed to the fourth speed. When the control proceeds to the shift from the fourth speed to the third speed after the shift from the fifth speed to the fourth speed is finished, the control of engaging the brake B1 and the control of disengaging the clutch C0 are performed to perform a shift to the third speed which is the requested shift step (third shift step).

The multiple shift control of the present embodiment described above is performed by the AT-ECU (multiple shift control means) 36 according to the respective routines shown in FIG. 8 to FIG. 27. Hereinafter, the processing contents of the respective routines will be described.

[Routine for Controlling a Shift]

Figure 8:
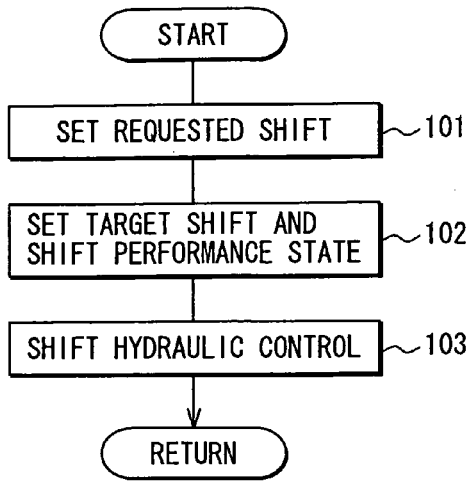
FIG. 8 is a flow chart showing the flow of processing of a routine for controlling a shift.
Figure 9:
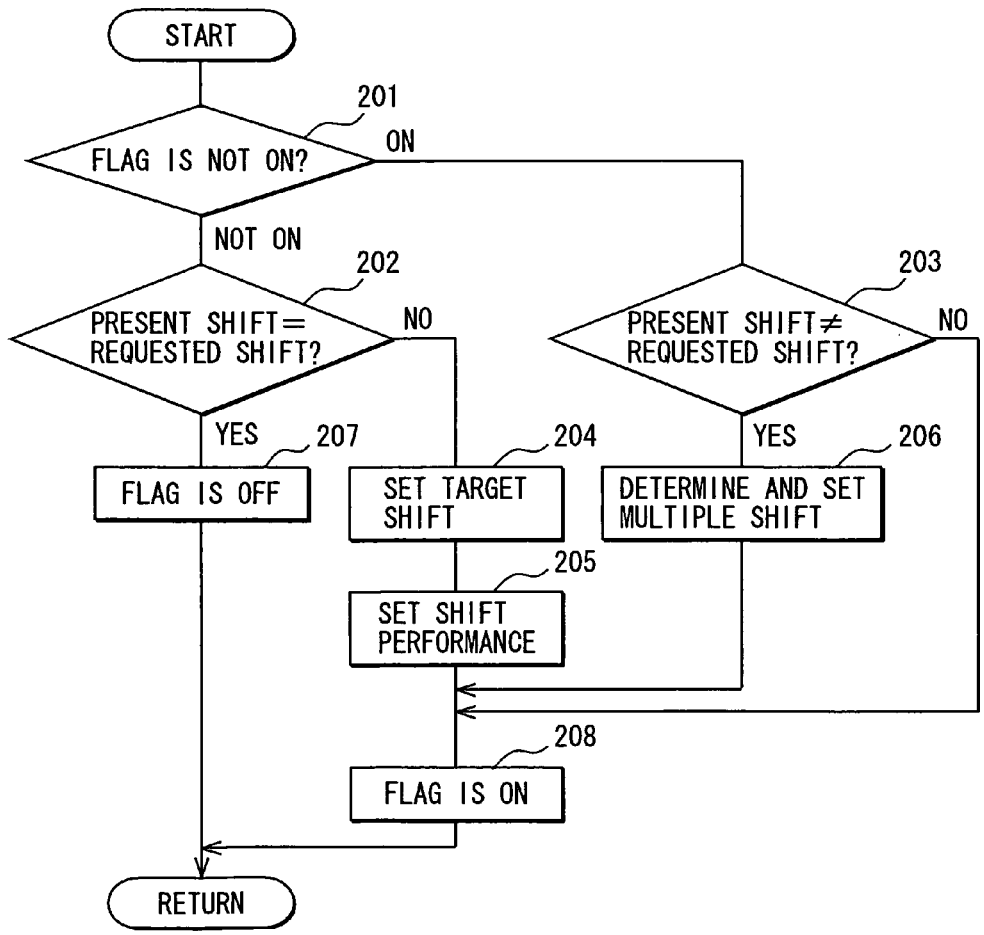
FIG. 9 is a flow chart showing the flow of processing of a routine for setting a target shift step and a shift performance state.

A routine for controlling a shift, which is shown in FIG. 8, is performed at specified periods during the operation of the engine and functions as a main routine for controlling the whole operation of shifting. When this routine is started, first, a requested shift step is set in Step S101 according to the operating position of the shift lever 30 and operating conditions (throttle position, vehicle speed, and the like) in accordance with the shift pattern shown in FIG. 3. Then, the routine proceeds to Step S102 where a routine for setting a target shift step and a shift performance state, which will be described in FIG. 9, is performed to set a target shift step and a shift performance state. Then, the routine proceeds to Step S103 where shift hydraulic control is performed.

[Routine for Setting a Target Shift Step and a Shift Performance State]

The routine for setting a target shift step and a shift performance state, which is shown in FIG. 9, is a sub-routine started in Step S102 of the routine for controlling a shift, shown in FIG. 8. When this routine is started, first, it is determined in Step S201 whether or not a flag for denoting that a shift is in progress (hereinafter referred to as "in-shift flag") is not ON. When it is determined that the in-shift flag is not ON, it is determined that shifting is not being performed and the routine proceeds to Step S202 where it is determined whether or not a present shift step agrees with the requested shift step. When the present shift step agrees with the requested shift step, it is determined that a request to change a shift step is not made and the routine proceeds to Step S207 where the in-shift flag is reset (OFF) and this routine is finished.

In contrast to this, when it is determined in Step S202 that the present shift step does not agree with the requested shift step, the routine proceeds to Step S204 where a target shift step is set according to a shift table shown in FIG. 20 from the present shift step and the requested shift step. The shift table shown in FIG. 20 is set so as to control a shift change with stability by always performing the hydraulic control of changing a shift range by the use of a transmission gear mechanism including one engaged clutch and one disengaged clutch or either or them in such a kind of shift that limits a discrete shift. For example, in a case where a request to switch to the second speed is made when the present shift step is the fifth speed, when a shift from the fifth speed to the second speed is performed in one stroke according to the engagement table shown in FIG. 2, it is necessary to disengage the clutches C0, C1 and to engage the clutch C2 and the brake B2, that is, to control four friction engaging components. However, according to the shift table shown in FIG. 20, when a shift from the fifth speed to the second speed is performed, by setting a target shift step at the third speed, a shift from the fifth speed to the third speed in which the clutch C0 is disengaged and the clutch C2 is engaged is performed and then a shift from the third speed to the second speed in which the clutch C1 is disengaged and the brake B2 is engaged is performed. In this manner, a shift from the fifth speed to the second speed is finally performed.

Figures 22, 23:
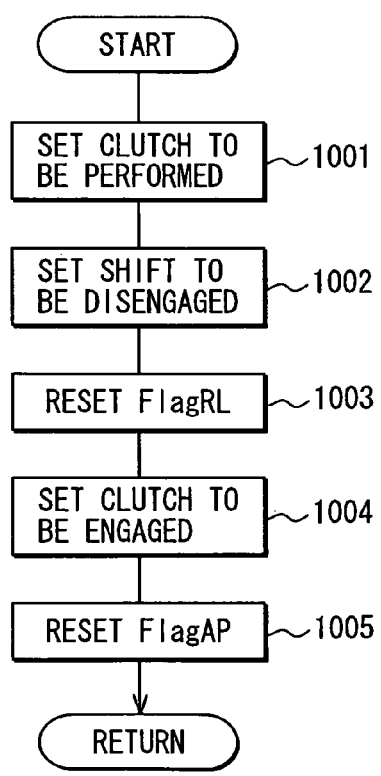
FIG. 22 is a diagram showing one example of a table for setting a shift method according to an engagement pattern of a multiple target shift step from the kind of a shift and a multiple target shift step.
FIG. 23 is a flow chart showing the flow of processing of a routine for setting shift performance.

Then, the routine proceeds to Step S205 where a routine for setting shift performance, which will be described later shown in FIG. 23, is performed to set the kind of a shift to be performed from the present shift step and the target shift step set in Step S204 to set friction engaging components that are to be disengaged or engaged. Describing the detail, as shown in FIG. 2, for example, when the present shift step is the fifth speed and the target shift step is the third speed, the kind of a shift to be performed is a shift from the fifth speed to the third speed and a friction engaging component that is to be disengaged is the clutch C0 and a friction engaging component that is to be engaged is the clutch C2. Thereafter, the routine proceeds to Step S208 where the in-shift flag is set (ON) and the present routine is finished.

Figure 10:
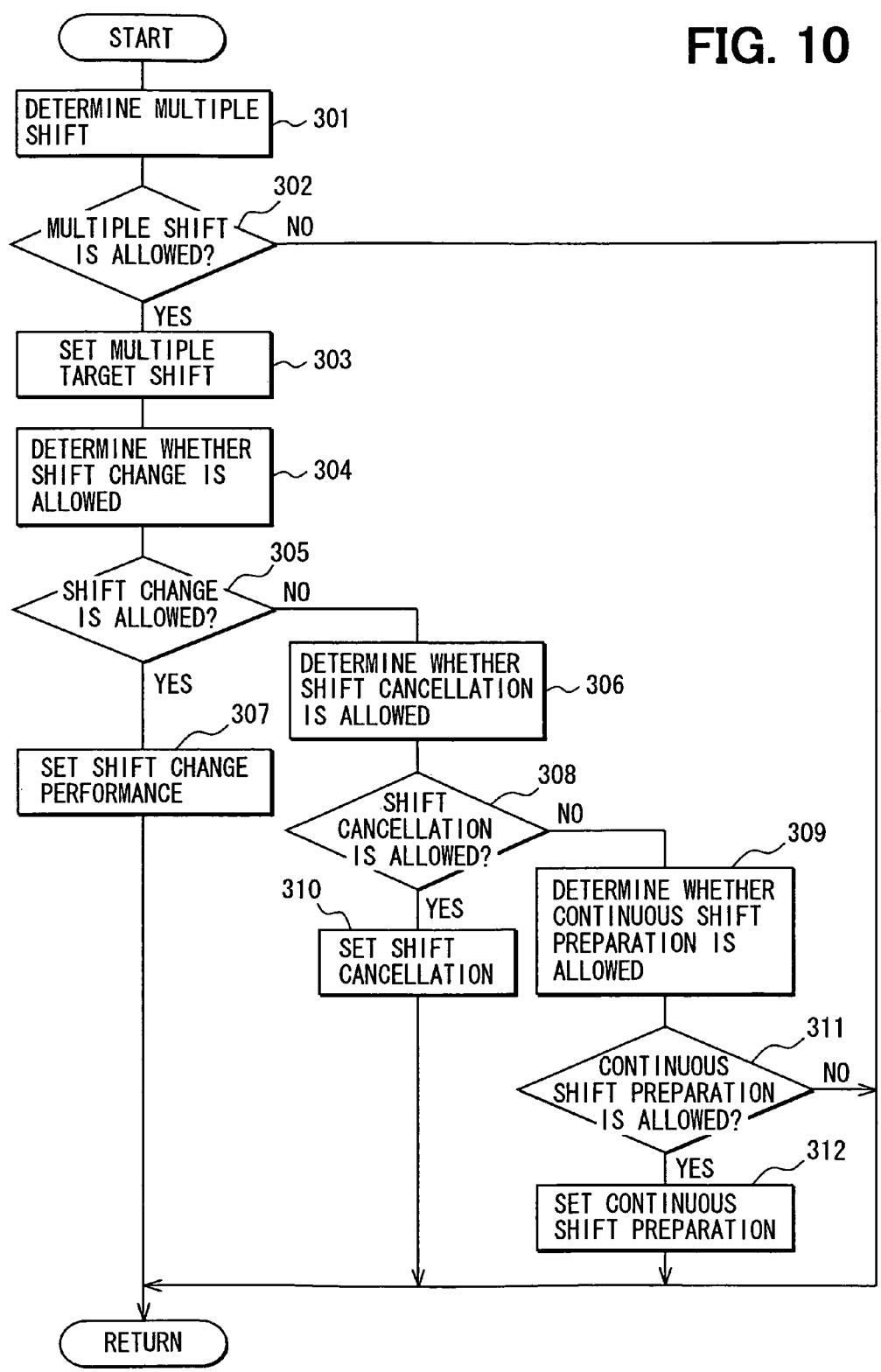
FIG. 10 is a flow chart showing the flow of processing of a routine for determining and setting a multiple shift.

Meanwhile, when it is determined in Step S201 that the in-shift flag is ON, it is determined that a shift is in progress and the routine proceeds to Step S203 where it is determined whether or not a requested shift step is different from the target shift step. When the requested shift step agrees with the target shift step, the routine proceeds to Step S208 where the in-shift flag is set (ON) and the present routine is finished. In contrast to this, when it is determined in Step S203 that the requested shift step is different from the target shift step, the routine proceeds to Step S206 where a routine for determining and setting a multiple shift, which will be described later shown in FIG. 10, is performed and then the routine proceeds to Step S208 where the in-shift flag is set (ON) and the present routine is finished.

The description of the flow of processing of the above-mentioned routine for setting a target shift step and a shift performance state shown in FIG. 9 from the viewpoint of the state of a shift is as follows.

(1) When a shift is not in progress, Step 201, Step 202, and Step 207 are performed in this series.

(2) When a shift is started, Step 201, Step 202, Step 204, Step 205, and Step 208 are performed in this series.

(3) When a shift is in progress, Steps 201, Step 203, and Step 208 are performed in this series.

(4) When a multiple shift is determined, Steps 201, Step 203, Step 206, and Step 208 are performed in this series.

[Routine for Determining and Setting a Multiple Shift]

Figure 11:
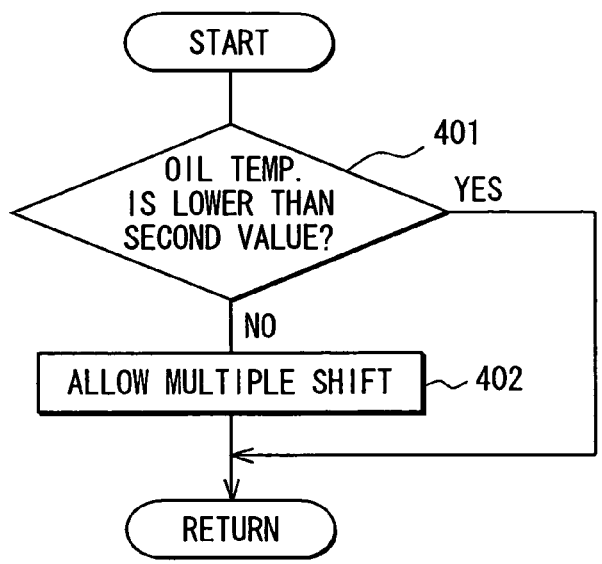
FIG. 11 is a flow chart showing the flow of processing of a routine for determining multiple shift allowance.

A routine for determining and setting a multiple shift, which is shown in FIG. 10, is a sub-routine started in Step S206 of the above-mentioned routine for setting a target shift step and a shift performance state, which is shown in FIG. 9. When this routine is started, first, a routine for determining whether or not a multiple shift is allowed, which will be described later in FIG. 11, is performed in Step S301 to determine whether or not a multiple shift is allowed. Thereafter, the routine proceeds to Step S302 and when it is determined on the basis of the determination result in Step S301 that a multiple shift is not allowed, the present routine is finished without performing the subsequent processing. Here, when a multiple shift is not allowed, a new shift request is not received during performing the shift but a multiple shift is not performed.

Figure 12:
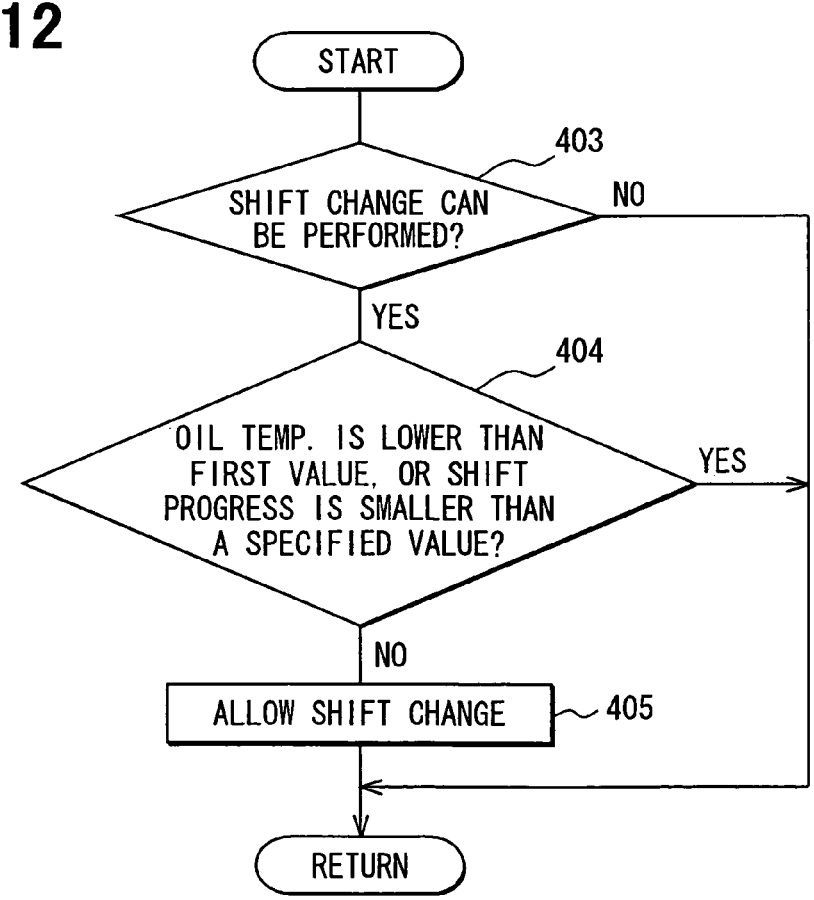
FIG. 12 is a flow chart showing the flow of processing of a routine for determining whether or not a shift change is allowed.

In contrast to this, when it is determined in Step S302 that a multiple shift is allowed, the routine proceeds to Step S303 where a multiple target shift step is set from the target shift step and the requested shift step according to a shift table shown in FIG. 21, just as with the setting processing in Step S204 shown in FIG. 9. Then, the routine proceeds to Step S304 where a routine for determining whether or not a shift change is allowed, which will be described later in FIG. 12, is performed to determine whether or not a shift change is allowed.

Figure 24:
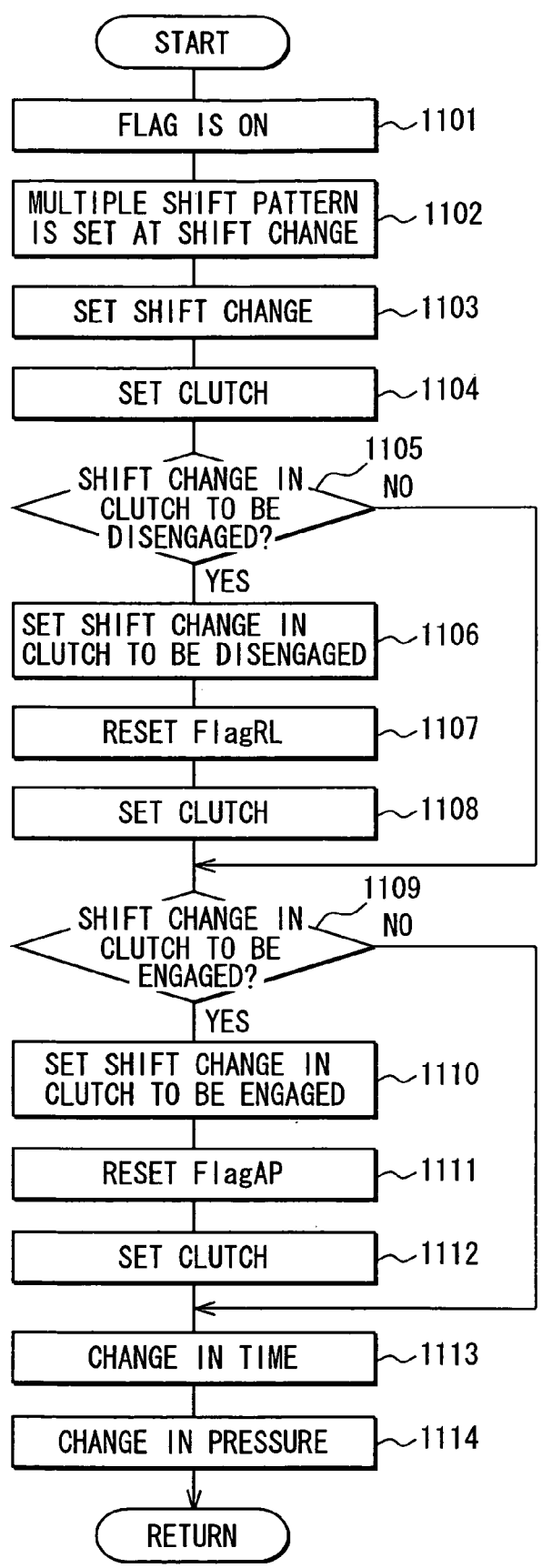
FIG. 24 is a flow chart showing the flow of processing of a routine for setting shift change performance.

Thereafter, the routine proceeds to Step S305 where it is determined on the basis of the determination result in Step S304 whether or not a shift change is allowed. Then, when it is determined that a shift change is allowed, the routine proceeds to Step S307 where a routine for setting shift change performance, which will be described later in FIG. 24, is performed to change the kind of a shift to be performed and friction engaging components that are to be disengaged or engaged as settings for performing the shift change. Settings for friction engaging components, which are to be completely engaged or disengaged by the shift change, are changed so as to perform multiple shift hydraulic control. This is shown in detail in FIG. 4.

For example, when a multiple target shift step is changed to the third speed during performing a shift from the fifth speed to the fourth speed, the kind of a shift to be performed is changed from a shift from the fifth speed to the third speed and settings are changed in such a way that the clutch C2 is engaged (continuously engaged) and that the clutch C0 is disengaged. Settings are changed in such a way that pressure increasing control is performed to the brake B1, to which disengaging control is performed at the time of performing the shift from the fifth speed to the fourth speed, so as to completely engage the brake B1 in place of the clutch C0. That is, by changing settings in this manner, in shift hydraulic control that will be described later, the control of engaging the clutch C2 is continued whereas the control of disengaging the brake B1 is stopped and the control of increasing hydraulic pressure for the brake B1 at the time of a shift change is performed, and the hydraulic control of disengaging the clutch C0 in place of the brake B1 is performed. With this, a shift change to the shift from the fifth speed to the third speed is performed.

Figure 13:
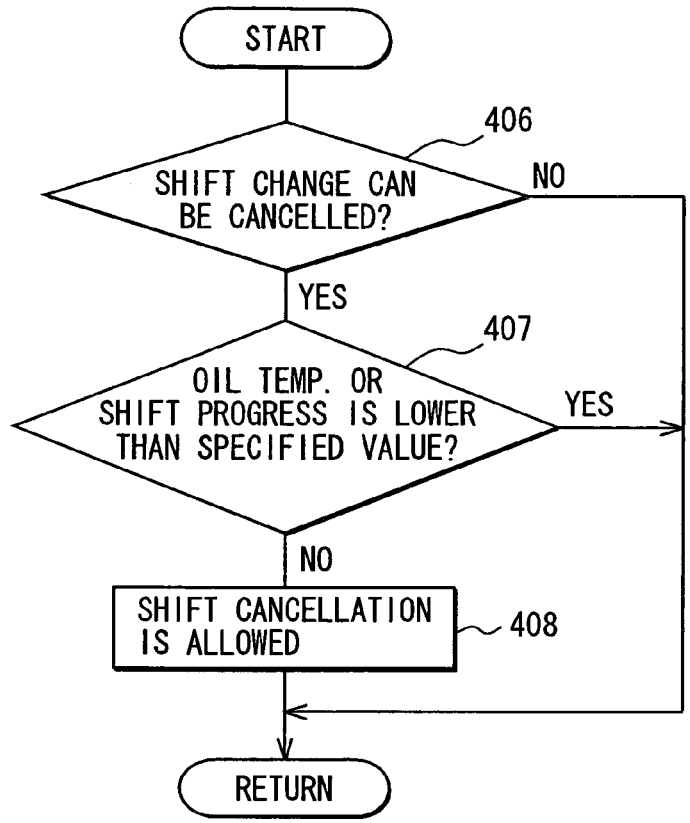
FIG. 13 is a flow chart showing the flow of processing of a routine for determining whether or not shift cancellation is allowed.

Meanwhile, when it is determined in Step S305 that a shift change is not allowed, the routine proceeds to Step S306 where a routine for determining whether or not shift cancellation, which will be described later in FIG. 13, is allowed is performed to determine whether or not shift cancellation is allowed. Thereafter, the routine proceeds to Step S308 where it is determined on the basis of determination result in Step S306 whether or not shift cancellation is allowed. When shift cancellation is allowed, the routine proceeds to Step S310 where settings are changed so as to perform the shift cancellation in such a way that the hydraulic control of engaging or disengaging the friction engaging components in the kind of a shift in the process of being performed is stopped and that the control of increasing hydraulic pressure for the friction engaging components that are to be engaged in the shift cancellation and of decreasing hydraulic pressure for the friction engaging components that are to be disengaged in the shift cancellation is performed. This processing is shown in detail in FIG. 5. For example, when a multiple target shift step is set at the fifth speed during performing a shift from the fifth speed to the fourth speed, settings are changed in such a way that the control of disengaging the brake B1 during performing the shift from the fifth speed to the fourth speed is changed to the control of increasing hydraulic pressure for brake B1 at the time of the shift cancellation so as to completely engage the brake B1 and that the control of engaging the clutch C2 during performing the shift from the fifth speed to the fourth speed is changed to the control of decreasing hydraulic pressure for clutch C2 so as to disengage the clutch C2 at the time of the shift cancellation. With this setting change, the control of canceling a shift is performed in the shift hydraulic control that will be described later.

Figure 14:
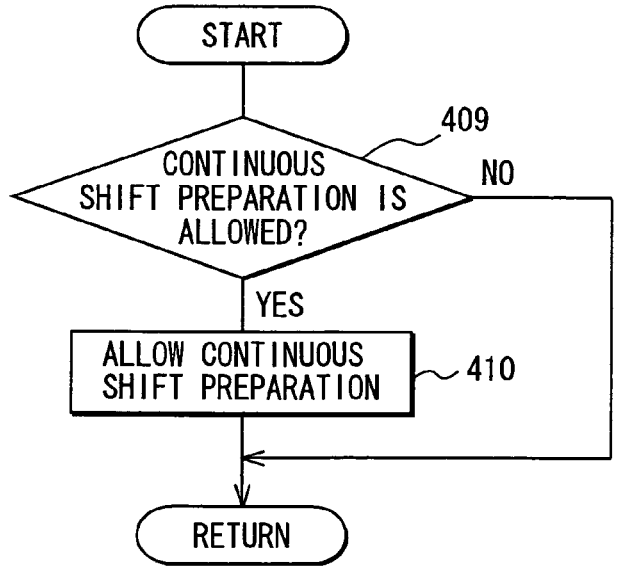
FIG. 14 is a flow chart showing the flow of processing of a routine for determining whether or not continuous shift preparation is allowed.

In contrast to this, when it is determined in Step S306 that shift cancellation is not allowed, the routine proceeds to Step S309 where a routine for determining whether or not continuous shift preparation, which will be described later in FIG. 14, is allowed to determine whether or not continuous shift preparation is allowed. Thereafter, the routine proceeds to Step S311 where it is determined whether or not it is determined in Step S309 that continuous shift preparation is allowed. When it is determined in Step S309 that continuous shift preparation is allowed, the routine proceeds to Step S312 where friction engaging components for which continuous shift preparation is to be performed are set as the setting of performing continuous shift preparation. This processing is shown in detail in FIG. 6. For example, when a multiple target shift step is set at the second speed during performing a shift from the fourth speed to the third speed, the control of disengaging the clutch C0 and the control of engaging the brake B1 for the purpose of performing the shift from the fourth speed to the third speed are continued so as to perform the shift from the fourth speed to the third speed. At the same time, for the purpose of performing such a shift from the third speed to the second speed that is to be continuously performed next in succession, settings are made in such a way that the control of hydraulic pressure for disengaging and holding the clutch C1 is performed at the time of the continuous shift preparation and that the control of hydraulic pressure for engaging the brake B2 is performed at the time of the continuous shift preparation. With this setting, the control of continuous shift preparation is performed in the shift hydraulic control that will be described later.

When it is determined in Step S311 that continuous shift preparation is not allowed, the present routine is finished without performing any processing. In this case, the multiple shifts are not performed.

[Routine for Determining Whether or not Multiple Shifts are Allowed]

A routine for determining whether or not a multiple shift is allowed, which is shown in FIG. 11, is a sub-routine started in Step S301 in the routine for determining and setting a multiple shift, which is shown in FIG. 10, and acts as determination means. When this routine is started, first, it is determined in Step S401 whether or not an oil temperature is lower than a second specified value. When the oil temperature is not lower than the second specified value, the routine proceeds to Step S402 where the setting of allowing a multiple shift is performed. When the oil temperature is lower than the second specified value, it is determined that a second prohibiting condition holds and the present routine is finished without performing the setting of allowing a multiple shift. The threshold (second specified value) of the oil temperature used for determination in the Step S401 is set at a value lower than the threshold of the oil temperature (first specified value) used for determination in Step S404 of the routine for determining whether or not a shift change is allowed, which will be described later in FIG. 12.

[Routine for Determining Whether or not Shift Change is Allowed]

The routine for determining whether or not a shift change is allowed, which is shown in FIG. 12, is a sub-routine started in Step S304 of the routine for determining and setting a multiple shift, which is shown in FIG. 10, and acts as determination means. When this routine is started, first, in Step S403, on the basis of the table in FIG. 22 from the multiple target shift step determined in Step S303 shown in FIG. 10 and the kind of a shift in the process of being performed, it is determined whether or not a shift change can be performed. The table shown in FIG. 22 is a table for setting a shift method according to the engagement pattern of a multiple target shift step determined from the kind of a shift, which is set from the present shift step and the target shift step, and the multiple target shift step.

For example, when a multiple target shift step (third shift step) is set at the third speed during performing a shift from the fifth speed to the fourth speed, a shift to the third speed from a state, in which the brake B1 is disengaged and the clutch C2 is engaged at the time of performing the shift from the fifth speed to the fourth speed, can be performed by continuing engaging the clutch C2 and by disengaging the clutch C0 in place of disengaging the brake B1. Hence, it is set in the table in FIG. 22 that this shift change is allowed.

Moreover, when a multiple target shift step is set at the fifth speed during performing the shift from the fifth speed to the fourth speed, the multiple target shift step is the same as the present shift step and hence it is set that a shift to the fourth speed can be cancelled. Even when a request to switch to a shift to the first speed or the second speed is made during performing the shift from the fifth speed to the fourth speed, a shift method of performing the shift to the first speed or the second speed during performing the shift from the fifth speed to the fourth speed is not set because the multiple target shift step is set at the third speed in Step S303 shown in FIG. 10.

Furthermore, when a multiple target shift step is set at the second speed during performing a shift from the fourth speed to the third speed, in order to perform a shift to the second speed from a state where the clutch C0 is disengaged and the brake B1 is engaged to perform the shift from the fourth speed to the third speed, it is further necessary to disengage the clutch C1 and to engage the brake B2. In this case, different friction engaging components are disengaged and engaged so as to perform the shift to the second speed during performing the shift from the fourth speed to the third speed and hence it is set that continuous shift preparation is allowed. In this manner, a method for performing a multiple shift is previously compiled and set for all of the kinds of shifts and the multiple target shift steps.

When it is determined in Step S403 that a multiple target shift step cannot be changed, the present routine is finished without performing the setting of allowing a shift change. When it is determined in Step S403 that a multiple target shift step can be changed, the routine proceeds to Step S404 where it is determined whether or not a shift change is allowed by whether or not the oil temperature is lower than the first specified value or by whether or not the degree of progress in the shift (gear ratio) is smaller than a specified value. The determination threshold (first specified value) of the oil temperature used for determination in this Step S404 is set at a value higher than the determination threshold (second specified value) of the oil temperature for determination in Step S301 shown in FIG. 10.

When determination result in this Step S404 is NO, the routine proceeds to Step S405 where the setting of allowing a shift change is performed. When determination result in this Step S404 is YES, it is determined that the first prohibiting condition holds and the present routine is finished without performing the setting of allowing a shift change.

[Routine for Determining Whether or not Shift Cancellation is Allowed]

A routine for determining whether or not shift cancellation is allowed, which is shown in FIG. 13, is a sub-routine started in Step S306 of the routine for determining and setting a multiple shift and acts as determination means. When this routine is started, first, in Step S406, just as with the determination of whether or not a shift change is allowed, which is performed in Step S304 shown in FIG. 10, it is determined on the basis of the table shown in FIG. 22 from the multiple target shift step determined in Step S303 shown in FIG. 10 and the kind of a shift in the process of being now performed, whether or not shift cancellation is allowed. When it is determined that shift cancellation can be performed, the routine proceeds to Step S407 where it is determined whether or not the shift cancellation is allowed by whether or not the oil temperature or the degree of progress in the shift (gear ratio) is lower than a specified value.

When determination result in this Step S407 is NO, the routine proceeds to Step S408 where the setting of allowing shift cancellation is performed. In contrast to this, when determination result in this Step S406 is NO or when determination result in this Step S407 is YES, the present routine is finished without performing the setting of allowing shift cancellation.

[Routine for Determining Whether or not Continuous Shift Preparation is Allowed]

A routine for determining whether or not continuous shift preparation is allowed is a sub-routine started in Step S309 of the routine for determining and setting a multiple shift, which is shown in FIG. 10. When this routine is started, first, in Step S409, it is determined on the basis of the table shown in FIG. 22 from the multiple target shift step determined in Step S303 shown in FIG. 10 and the kind of a shift in the process of being now performed, whether or not continuous shift preparation is allowed. When it is determined that continuous shift preparation is allowed, the routine proceeds to Step S410 where the setting of allowing the continuous shift preparation is performed. When it is determined in Step S409 that continuous shift preparation is not allowed, the present routine is finished without performing the setting of allowing continuous shift preparation.

[Routine for Controlling Hydraulic Pressure for Shift]

A routine for controlling hydraulic pressure for a shift is a sub-routine started in Step S103 of the routine for controlling a shift, which is shown in FIG. 8. When this routine is started, first, it is determined in Step S501 whether or not the in-shift flag is set (ON) (the shift is now in process). When it is determined that in-shift flag is not set ON, it is determined that a shift is not in process and the present routine is finished without performing the subsequent processing.

Figure 16:
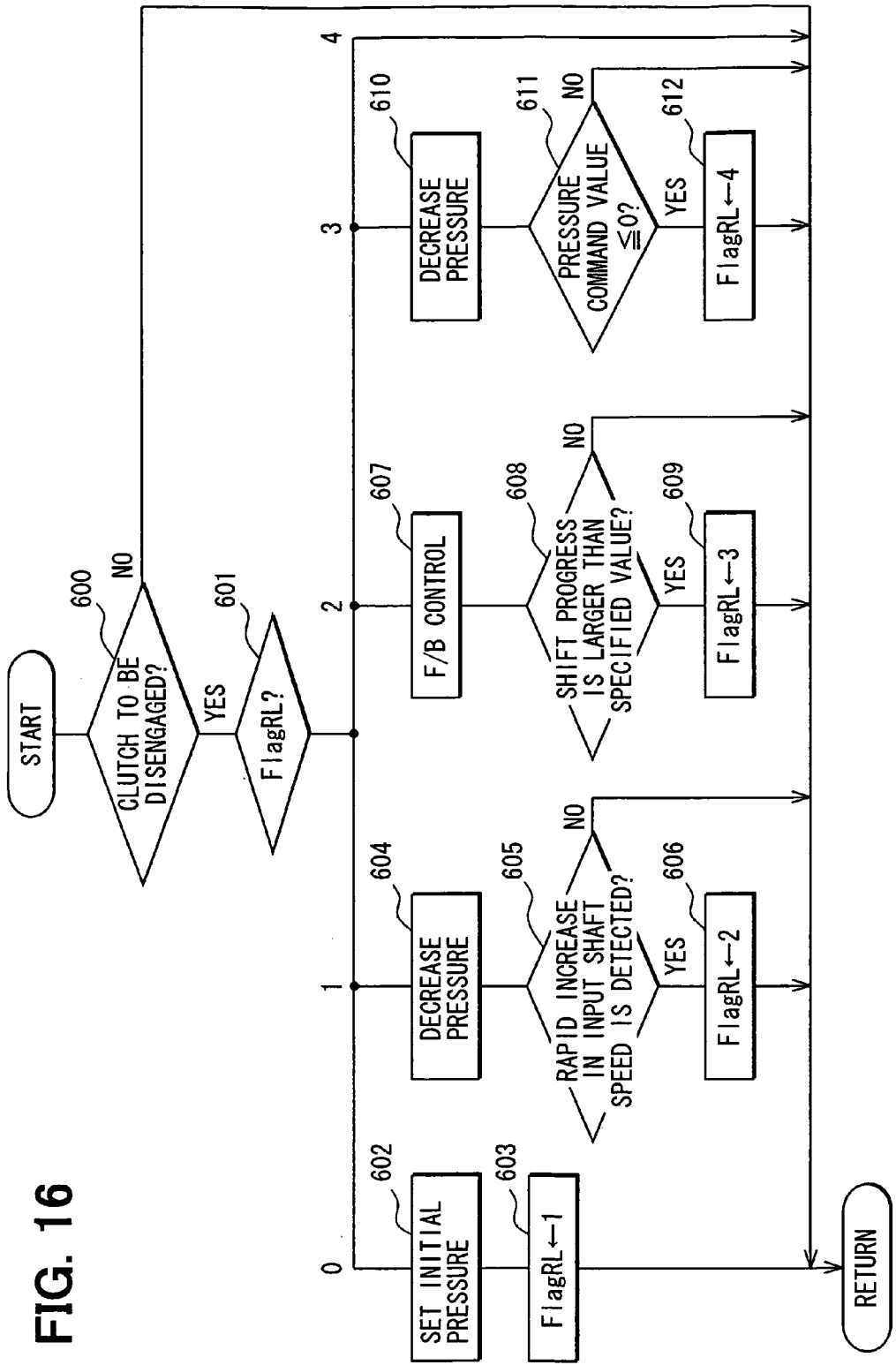
FIG. 16 is a flow chart showing the flow of processing of a routine for controlling the hydraulic pressure of a clutch that is to be disengaged.
Figure 17:
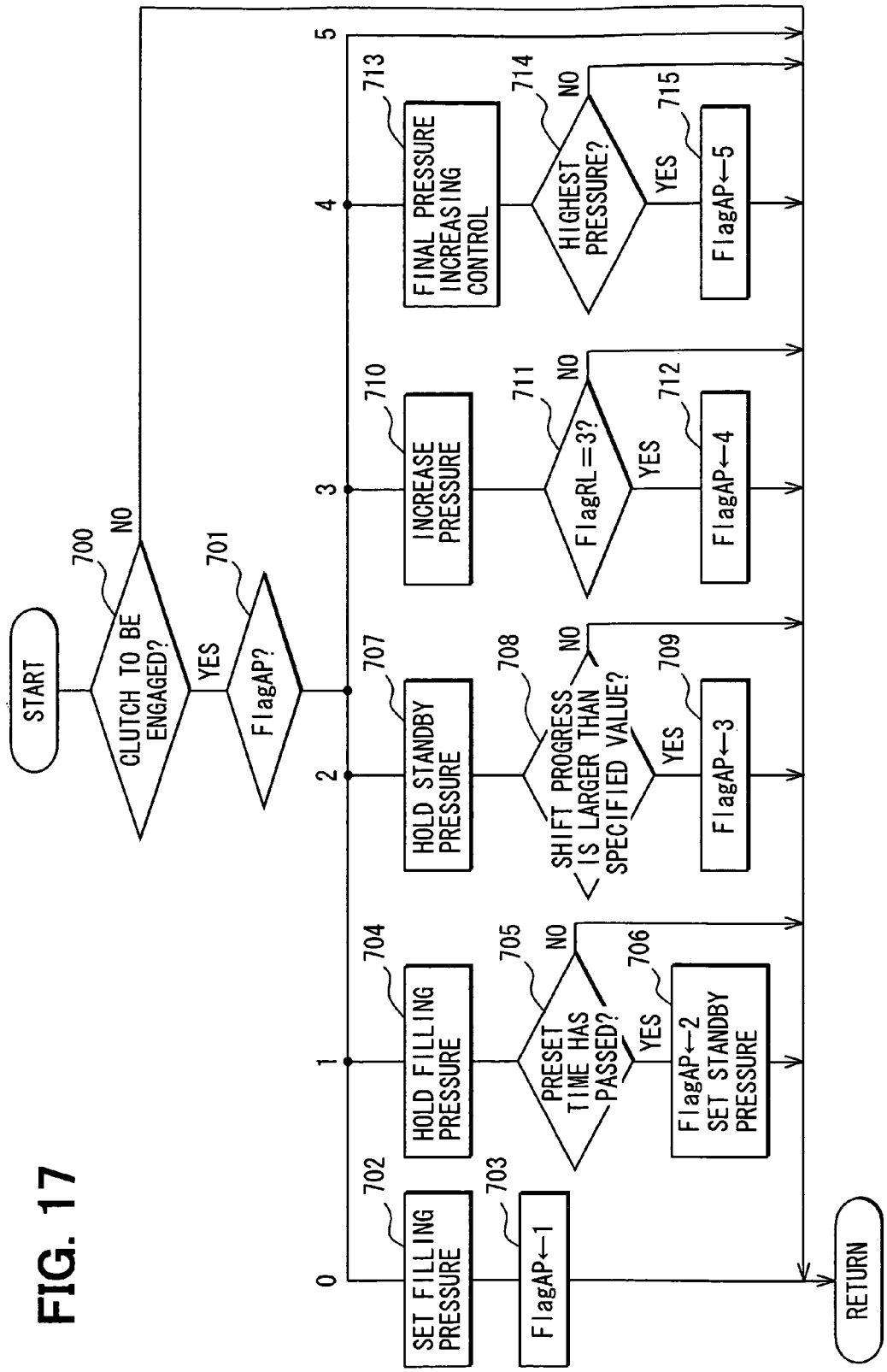
FIG. 17 is a flow chart showing the flow of processing of a routine for controlling the hydraulic pressure of a clutch that is to be engaged.
Figure 18:
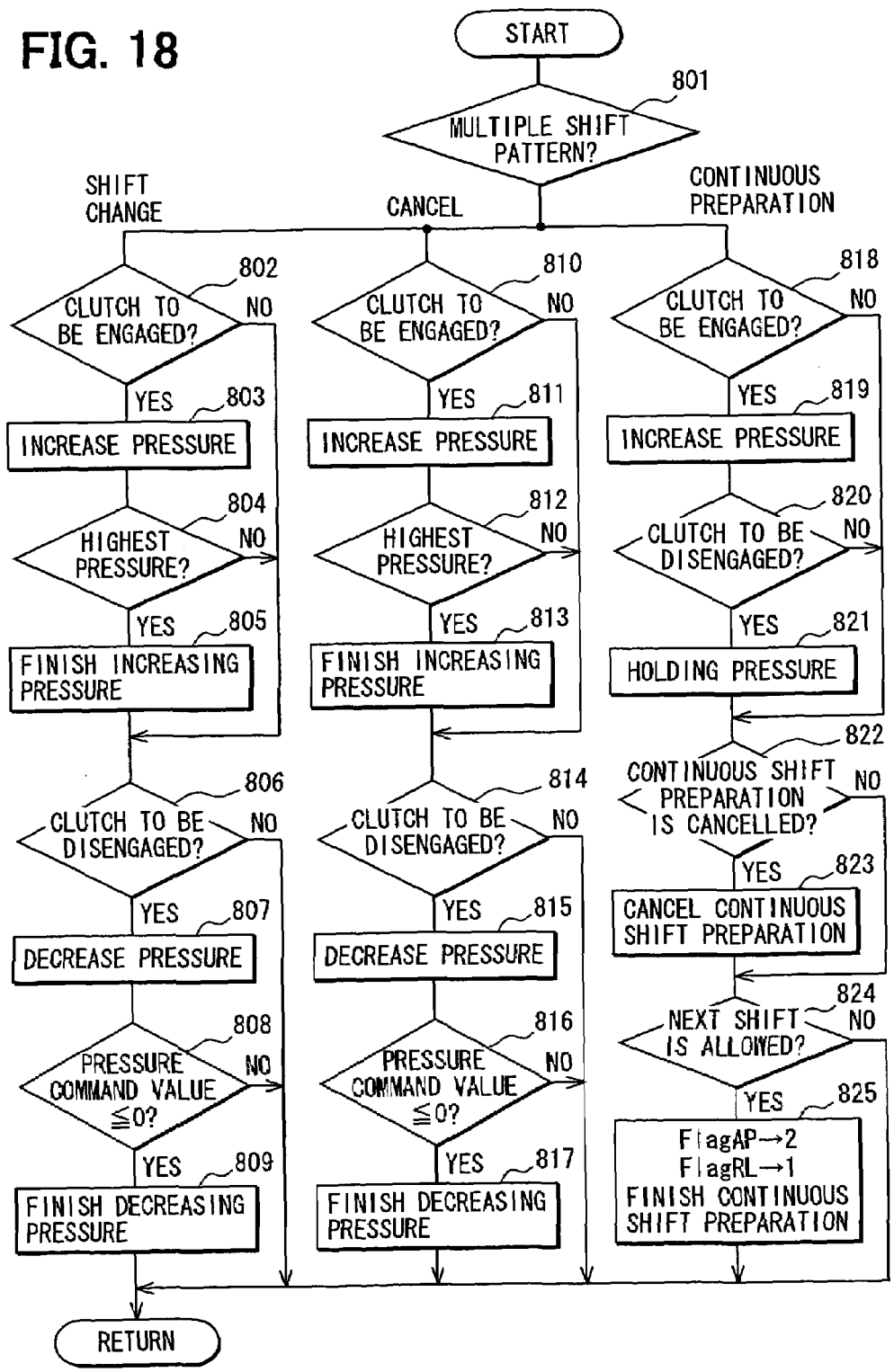
FIG. 18 is a flow chart showing the flow of processing of a routine for controlling hydraulic pressure for a multiple shift.

In contrast to this, when it is determined that in-shift flag is set (ON) (the shift is now in process), the routine proceeds to Step S502 where a routine for controlling hydraulic pressure for a clutch that is to be disengaged, which will be described later in FIG. 16, is performed. Then, the routine proceeds to Step S503 where a routine for controlling hydraulic pressure for a clutch that is to be engaged, which will be described later in FIG. 17, is performed. Then, the routine proceeds to the next Step S504 whether or not a multiple shift is in process. when it is determined that a multiple shift is in process, the routine proceeds to Step S505 where a routine for controlling hydraulic pressure for a multiple shift, which will be described later in FIG. 18, is performed.

Thereafter, the routine proceeds to Step S506 where it is determined whether or not shift is finished. when it is determined that shift is being performed, the present routine is finished without performing anything. When it is determined that shift is finished, the routine proceeds to Step S507 where the processing of finishing shift is performed.

[Routine for Controlling Hydraulic Pressure for Clutch that is to be Disengaged]

Figure 15:
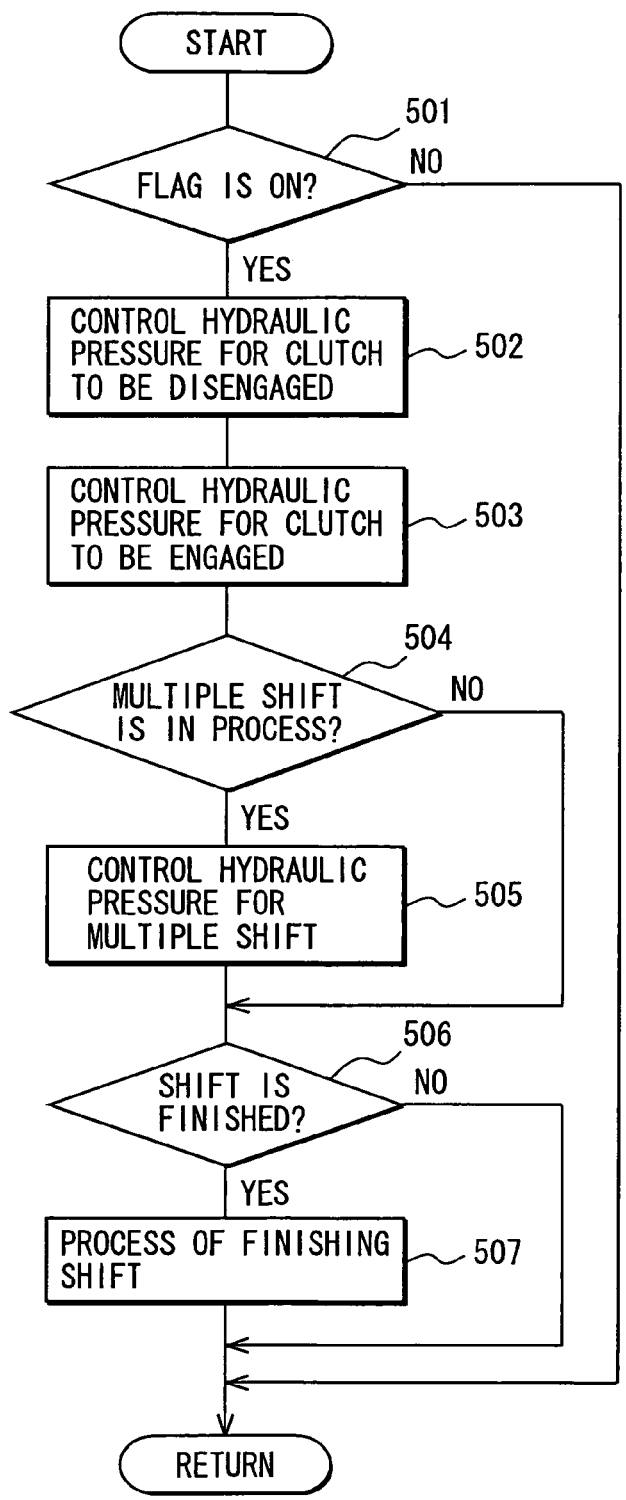
FIG. 15 is a flow chart showing the flow of processing of a routine for controlling hydraulic pressure for a shift.

A routine for controlling hydraulic pressure for a clutch that is to be disengaged is a sub-routine started in Step S502 of the routine for controlling hydraulic pressure for a shift, which is described in FIG. 15. When the present routine is started, first, it is determined in Step S600 whether or not there is a clutch that is to be disengaged (including also a brake that is to be disengaged, ditto for the following), which is switched from being engaged to being disengaged. When it is determined in Step S600 that there is not a clutch that is to be disengaged, the present routine is finished without performing any processing.

In contrast to this, when it is determined in Step S600 that there is a clutch that is to be disengaged, the routine proceeds to Step S601 where the present step of the control of hydraulic pressure for a clutch that is to be disengaged is determined by whether or not the value of a control step flag FlagRL of a clutch that is to be disengaged is any one of 0 to 4. This control step flag FlagRL is a flag, which is incremented by one every time the step of the control of hydraulic pressure for a clutch that is to be disengaged advances, and has an initial value 0 and a maximum value of 4. Hence, the control of hydraulic pressure for a clutch that is to be disengaged is a sequence control of four steps.

When the control of hydraulic pressure for a clutch that is to be disengaged is started, the control step flag FlagRL is set at an initial value (0) and hence the routine proceeds to Step S602 where the command value of hydraulic pressure for a clutch that is to be disengaged is set at an initial hydraulic pressure and where hydraulic pressure applied to the clutch that is to be disengaged is decreased to an initial hydraulic pressure. Then, the routine proceeds to Step S603 where the control step flag FlagRL is set at "1" (first step control) and then the present routine is finished.

When the present routine is started next time, because the control step flag FlagRL is already set at "1," the routine proceeds to Step S604 where the pressure decreasing control of decreasing the command value of hydraulic pressure for a clutch that is to be disengaged gently at a specified gradient (second step control) is performed. With this, the force of engaging the clutch that is to be disengaged is decreased to cause the capacity of transmission torque of the clutch that is to be disengaged to be smaller than torque inputted from the engine, whereby the rotational speed of the input shaft of the transmission gear mechanism 17 (rotational speed of the output shaft 16 of the torque converter 14) starts to increase rapidly.

This pressure decreasing control of the clutch that is to be disengaged (second step control) is continued until a rapid increase in the rotational speed of the input shaft is detected (Step S605). Then, when the rapid increase in the rotational speed of the input shaft is detected, the routine proceeds to Step S606 where the control step flag FlagRL is set at "2" and this second step control (pressure decreasing control) is finished and the routine proceeds to a third step control.

In this third step control, first, in Step S607, hydraulic pressure for the clutch that is to be disengaged is fed back in such a way that a gradient of the rapid increase in the rotational speed of the input shaft becomes a specified value. In the process of this feedback control, it is determined in Step S608 whether or not the degree of progress in the shift (degree of an increase in the rotational speed of the input shaft) is close to a specified value when the shift is finished.

When the degree of progress in the shift is not close to the specified value when the shift is finished, the feedback control is continued. Thereafter, when the degree of progress in the shift is close to the specified value when the shift is finished, the routine proceeds to Step S609 where the control step flag FlagRL is set at "3" and the third step control (feedback control) is finished and the routine proceeds to a fourth step control.

In this fourth step control, first, in Step S610, the final pressure decreasing control of decreasing the command value of hydraulic pressure for the clutch that is to be disengaged to "0" at a specified gradient is performed. Then, in the next Step S611, it is determined whether or not the command value of hydraulic pressure for the clutch that is to be disengaged is decreased to a value not larger than "0" and this fourth step control (final pressure decreasing control) is continued until the command value of hydraulic pressure for the clutch that is to be disengaged is decreased to the value not larger than "0." Thereafter, when the command value of hydraulic pressure for the clutch that is to be disengaged is decreased to the value not larger than "0," the routine proceeds to Step S612 where the control step flag FlagRL is set at "4" and this fourth step control is finished. With this, the control of hydraulic pressure for a clutch that is to be disengaged is completely finished.

[Routine for Controlling Hydraulic Pressure for Clutch that is to be Engaged]

A routine for controlling hydraulic pressure for a clutch that is to be engaged, which is shown in FIG. 17, is a sub-routine started in Step S503 of the routine for controlling hydraulic pressure for a shift, which is shown in FIG. 15, and is started at the same time when the control of hydraulic pressure for a clutch that is to be disengaged is started. When this routine is started, first, it is determined in Step S700 whether or not there is a clutch that is to be engaged, which is to be switched from being disengaged to being engaged (including a brake that is to be engaged, ditto for the following). When it is determined that there is not a clutch that is to be engaged, the present routine is finished without performing any processing.

In contrast to this, when it is determined that there is a clutch that is to be engaged, the routine proceeds to Step S701 where the present step of the control for hydraulic pressure for a clutch that is to be engaged is determined by whether or not the control step flag FlagAP of the clutch that is to be engaged is any one of 0 to 5. This control step flag FlagAP is a flag, which is incremented by one every time the step of the control of hydraulic pressure for a clutch that is to be engaged advances, and has an initial value of 0 and a maximum value of 5. Hence, the control of hydraulic pressure for a clutch that is to be engaged is a sequence control of five steps.

When the control of hydraulic pressure for a clutch that is to be engaged is started, the control step flag FlagAP is set at an initial value of "0." Hence, the routine proceeds to Step S702 where the command value of hydraulic pressure for the clutch that is to be engaged is set at a specified filling hydraulic pressure in such a way as to bring the clutch that is to be engaged to a state just before developing an engaging force and then the filling control of filling the clutch that is to be engaged with hydraulic oil is performed. Then, the routine proceeds to the next Step S703 where the control step flag FlagAP is set at "1" and then the present routine is finished.

When the present routine is started next time, because the control step flag FlagAP is already set at "1," the routine proceeds to Step S704 where filling hydraulic pressure is held and the routine proceeds to the next Step S705 where it is determined whether or not a specified time passes. Here, the specified time is a standard (average) time required for the clutch that is to be engaged to be brought by the filling control to a state just before developing an engaging force and is previously set by experiment, simulation, or the like.

Thereafter, when a filling control time reaches a specified time (when the clutch that is to be engaged is brought by the filling control to a state just before developing an engaging force), the routine proceeds from Step S705 to Step S706 where the control step flag FlagAP is set at "2" and the command value of hydraulic pressure for the clutch that is to be engaged is decreased to a standby hydraulic pressure and the filling control is finished. Thereafter, the clutch that is to be engaged is held by this standby hydraulic pressure in the state just before developing an engaging force.

Because the control step flag FlagAP is set at "2" for a period during which this standby hydraulic pressure is held, the routine proceeds from Step S707 to Step S708 where it is determined whether or not the degree of progress in the shift (degree of an increase in the rotational speed of the input shaft) advances to a specified step. When it is determined that the degree of progress in the shift advances to the specified step, the command value of hydraulic pressure for the clutch that is to be engaged is held at the standby hydraulic pressure. Thereafter, when it is determined that the degree of shift does not advance to a specified step, the routine proceeds from Step S708 to Step S709 where the control step flag FlagAP is set at "3" and the routine proceeds to the next Step S710 where the pressure increasing control of increasing the command value of hydraulic pressure for the clutch that is to be engaged gently at a specified gradient is started.

Thereafter, when the present routine is started, because the control step flag FlagAP is already set at "3," the routine proceeds to Step S710 where the pressure increasing control of increasing the command value of hydraulic pressure for the clutch that is to be engaged gently at the specified gradient is continued. Then, the routine proceeds to the next Step S711 where it is determined whether or not the control step flag FlagRL of the clutch that is to be disengaged is set at "4" (in other words, whether or not the control step of the clutch that is to be disengaged advances to the final pressure decreasing control). When the control step flag FlagRL of the clutch that is to be disengaged is not set at "4," the present routine is finished without performing any processing and the pressure increasing control of the clutch that is to be engaged is continued. With this control, the engaging force of the clutch that is to be engaged is increased in accordance with timing when the rotational speed of the input shaft increases to the rotational speed corresponding to the low speed step to which a downshift is performed.

Thereafter, the control step flag FlagRL of the clutch that is to be disengaged is switched to "4" and when the control step of the clutch that is to be disengaged advances to the final pressure decreasing control, the routine proceeds from Step S711 to Step S712 where the control step flag FlagAP of the clutch that is to be engaged is set at "4."

With this, the pressure increasing control of the clutch that is to be engaged is finished and the routine proceeds to Step S713 where the final pressure increasing control of increasing the command value of hydraulic pressure for the clutch that is to be engaged to the highest hydraulic pressure is performed. It is determined in Step S714 during performing this final pressure increasing control whether or not the command value of hydraulic pressure for the clutch that is to be engaged reaches the highest hydraulic pressure. Then, when the command value of hydraulic pressure for the clutch that is to be engaged reaches the highest hydraulic pressure, the routine proceeds to Step S715 where the control step flag FlagAP is set at "5" and the control of hydraulic pressure for the clutch that is to be engaged is completely finished.

[Routine for Controlling Hydraulic Pressure for Multiple Shift]

A routine for controlling hydraulic pressure for a multiple shift, which is shown in FIG. 18, is a sub-routine started in Step S505 of the routine for controlling hydraulic pressure for a shift, which is shown in FIG. 15. When this routine is started, first, a multiple shift pattern is determined in Step S801 to select any one of operations of hydraulic control at the time of a shift change, shift cancellation, and continuous shift preparation.

When a shift change is selected in this Step S801, processing in Steps 802 to 809 is performed to control hydraulic pressure applied to the clutches (including brakes, ditto for the following), which are to be completely engaged or completely disengaged by the shift change, in the following manner. First, in Step 802, it is determined whether or not there is a clutch that is to be engaged at the time of the shift change. When it is determined that there is a clutch to be completely engaged at the time of the shift change, the routine proceeds to Step S803 where the pressure increasing control of increasing the command value of hydraulic pressure for the clutch to the highest hydraulic pressure is performed. It is determined in Step 804 during this pressure increasing control whether or not the command value of hydraulic pressure for the clutch reaches the highest hydraulic pressure. When the command value of hydraulic pressure for the clutch reaches the highest hydraulic pressure, the routine proceeds to Step S805 where the pressure increasing control of the clutch that is to be engaged at the time of the shift change is finished.

Then, it is determined in the next Step S806 whether or not there is a clutch that is to be disengaged at the time of the shift change. When there is a clutch that is to be completely disengaged at the time of the shift change, the hydraulic pressure decreasing control of decreasing the command value of hydraulic pressure for the clutch that is to be completely disengaged at the time of the shift change to zero is performed in Step S807. It is determined in Step S808 during this hydraulic pressure decreasing control whether or not the hydraulic pressure command value reaches a value not larger than zero. When the hydraulic pressure command value reaches the value not larger than zero, the routine proceeds to Step S809 where the pressure increasing control of the clutch that is to be engaged at the time of the shift change is finished.

Depending on a shift change pattern, only one of the engaging control and the disengaging control may be performed. When both of the engaging control and the disengaging control are finished, the control at the time of the shift change is finished.

When shift cancellation is selected in Step S801, processing in Steps 810 to 817 is performed to control hydraulic pressure for the clutches that is to be completely engaged or disengaged by the shift cancellation in the following manner. First, it is determined in Step S810 whether or not there is a clutch that is to be engaged at the time of the shift cancellation. When there is a clutch that is to be completely engaged at the time of the shift cancellation, the routine proceeds to Step 811 where the pressure increasing control of increasing the command value of hydraulic pressure for the clutch to the highest hydraulic pressure is performed. It is determined in Step 812 during this pressure increasing control whether or not the command value of hydraulic pressure for the clutch reaches the highest hydraulic pressure. When the command value of hydraulic pressure for the clutch reaches the highest hydraulic pressure, the routine proceeds to Step S813 where the pressure increasing control of the clutch that is to be engaged at the time of the shift cancellation is finished.

Thereafter, the routine proceeds to Step S814 where it is determined whether or not there is a, clutch that is to be disengaged at the time of the shift cancellation. When there is a clutch that is to be completely disengaged at the time of the shift cancellation, the routine proceeds to Step S815 where the hydraulic pressure decreasing control of decreasing the command value of hydraulic pressure for the clutch that is to be completely disengaged at the time of the shift change to zero is performed. It is determined in Step S816 during this hydraulic pressure decreasing control whether or not the hydraulic pressure command value reaches a value not larger than zero. When the hydraulic pressure command value reaches the value not larger than zero, the routine proceeds to Step S817 where the pressure increasing control of the clutch that is to be engaged at the time of the shift cancellation is finished.

Depending on a shift cancellation pattern, only one of the engaging control and the disengaging control may be performed. When both of the engaging control and the disengaging control are finished, the control at the time of the shift cancellation is finished.

Figure 19:
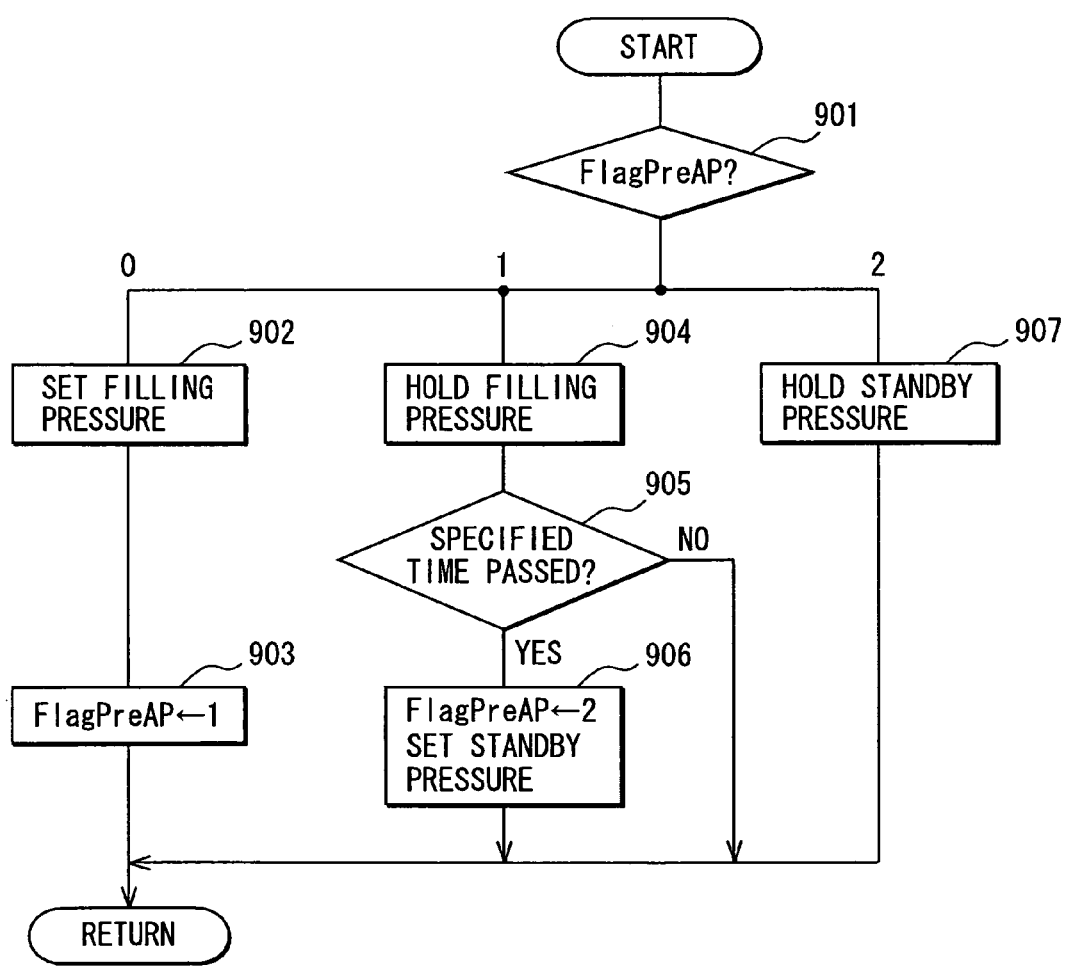
FIG. 19 is a flow chart showing the flow of processing of a routine for determining whether or not continuous shift preparation is allowed.

When continuous shift preparation is selected in Step S801, processing in Steps 818 to 825 is performed to control hydraulic pressure for the clutches, for which engaging preparation or disengaging preparation is to be made so as to prepare for continuous shift, in the following manner. First, it is determined in Step S818 whether or not there is a clutch that is to be engaged at the time of the continuous shift preparation. When there is a clutch that is to be engaged at the time of the continuous shift preparation, the routine proceeds to Step 819 where a routine for controlling hydraulic pressure for a clutch that is to be engaged at the time of continuous shift preparation, which will be described later in FIG. 19, is performed to control hydraulic pressure for the clutch that is to be engaged for the continuous shift preparation.

Thereafter, the routine proceeds to Step S820 where it is determined whether or not there is a clutch that is to be disengaged at the time of the continuous shift preparation. When there is a clutch that is to be disengaged at the time of the continuous shift preparation, the routine proceeds to Step S821 where the control of holding the hydraulic pressure for the clutch that is to be disengaged at the time of the continuous shift preparation is performed. This hydraulic pressure held for preparing the disengagement of a clutch is set at a value not smaller than the torque capacity of the clutch for the purpose of avoiding a delay in response of the hydraulic pressure for disengaging the clutch when the next shift is started.

Then, it is determined in the next Step S822 whether or not the continuous shift preparation is cancelled. When it is determined that the continuous shift preparation is cancelled, the routine proceeds to Step S823 where the control of engaging or disengaging a clutch, for which the continuous shift preparation is cancelled, is performed.

Thereafter, the routine proceeds to Step S824 where it is determined whether or not the next shift is allowed. At this time, whether or not the next shift is allowed is determined by whether or not the shift in the process is finished. The control of hydraulic pressure for the clutches, which has been described in Steps 819 and 821, is continued until there is brought about a state where the next shift is allowed. Then, when the next shift is allowed, the routine proceeds to Step S825 where the control of hydraulic pressure for a clutch that is to be disengaged performs the control of hydraulic pressure for a shift to a clutch, which has the control for continuous shift preparation performed thereto and thereby has continuous shift preparation performed thereto, from a state in which the control step flag FlagRL is "1" and where the control of hydraulic pressure for a clutch that is to be engaged performs the control of hydraulic pressure for a shift to the clutch from a state in which the control step flag FlagAP is "2." Depending on the shift pattern of the continuous shift preparation, only one of the engaging control and the disengaging control may be performed.

By performing the shift control of the respective steps of the routine for controlling hydraulic pressure for a multiple shift, which has been described in FIG. 18, the control of hydraulic pressure for a shift including a multiple shift is performed as appropriate to operate hydraulic sequences shown in FIG. 4 to FIG. 7.

[Routine for Controlling Hydraulic Pressure for Clutch that is to be Engaged at the Time of Continuous Shift Preparation]

A routine for controlling hydraulic pressure for a clutch that is to be engaged at the time of continuous shift preparation, which is described in FIG. 19, is a sub-routine started in Step S819 of the routine for controlling hydraulic pressure for a multiple shift in FIG. 18. When this routine is started, first, a control step flag FlagPreAP is determined in Step S901. When the control of hydraulic pressure for a clutch that is to be engaged is started, the control step flag FlagPreAP is set at an initial value (0) and hence the routine proceeds to Step S902. In this step, the command value of hydraulic pressure for the clutch that is to be engaged is set at a specified filling hydraulic pressure in such a way that the clutch that is to be engaged is brought to a state just before developing an engaging force and the filling control of filling the clutch that is to be engaged with the hydraulic oil is performed. Then, the routine proceeds to the next Step S903 where the control step flag FlagPreAP is set at "1" and then the present routine is finished.

When the present routine is started next time, the control step flag FlagPreAP is already set at "1" and hence the routine proceeds to Step S904 where the filling hydraulic pressure is held. Then, the routine proceeds to Step S905 where it is determined whether or not a specified time passes. Here, this specified time is a standard (average) time required for the clutch that is to be engaged to be brought by the filling control to a state just before developing an engaging force and is previously set by experiment, simulation, or the like.

Thereafter, when a filling control time reaches a specified time (when the clutch that is to be engaged is brought by the filling control to a state just before developing an engaging force), the routine proceeds from Step S905 to Step S906 where the control step flag FlagPreAP is set at "2" and where the command value of hydraulic pressure for the clutch that is to be engaged is decreased to the standby hydraulic pressure and where the filling control is finished. Thereafter, the clutch that is to be engaged is held in a state just before developing an engaging force by the standby hydraulic pressure.

[Routine for Setting Performance of Shift]

A routine for setting performance of a shift, which is described in FIG. 23, is a sub-routine started in Step S205 of the routine for setting a target shift step and a shift performance state. When the present routine is started, first, in Step S1001, the kind of a shift to be performed is set from the present shift step and a target shift step set in Step S204 shown in FIG. 9. Then, in the next Step S1002, a clutch that is to be disengaged, which is switched from being engaged to being disengaged, is set according to the kind of a shift to be performed. Then, the routine proceeds to Step S1003 where the control flag FlagRL of the clutch that is to be disengaged is reset.

Thereafter, the routine proceeds to Step S1004 where the clutch that is to be engaged, which is switched from being disengaged to being engaged, is set. Then, the routine proceeds to Step S1005 where the control flag FlagAP of the clutch that is to be engaged is reset and the present routine is finished.

[Routine for Setting Performance of Shift Change]

A routine for setting performance of a shift change, which is described in FIG. 24, is a sub-routine started in Step S307 of the routine for determining and setting a multiple shift, which has been described in FIG. 10. When this routine is started, first, a multiple shift performance flag is set (ON) in Step S1101 and then the routine proceeds to Step S1102 where a multiple shift pattern is set at "shift change." Then, the routine proceeds to Step S1103 where the kind of a shift to be performed is changed from the present shift step and the target shift step and the clutch that is to be changed for the shift change is set in the next step 1104.

Thereafter, the routine proceeds to Step S1105 where it is determined whether or not there is a shift change in a clutch that is to be disengaged. When there is a shift change in a clutch that is to be disengaged, the routine proceeds to Step S1106 where a change in the clutch that is to be disengaged is set. Then, the proceeds to Step S1107 where the control step flag FlagRL of a clutch that is to be disengaged is reset. Then, the routine proceeds to Step S1108 where a clutch, to which the control of increasing hydraulic pressure for engaging is performed at the time of shift change, is set. When there is not a shift change of a clutch that is to be disengaged, the processings in Steps S1106 to S1108 are not performed.

Thereafter, the routine proceeds to Step S1109 where it is determined whether or not there is a shift change in a clutch that is to be engaged. When there is a shift change in a clutch that is to be engaged, the routine proceeds to Step S1110 where a change in a clutch that is to be engaged is set. Then, the routine proceeds to Step S1111 where the control step flag FlagAP of a clutch that is to be engaged is reset. Then, the routine proceeds to Step S1112 where a clutch, to which the control of decreasing hydraulic pressure for disengaging is performed at the time of shift change, is set. When there is not a shift change in a clutch that is to be engaged, the processings in Steps S1109 to S1112 are not performed.

Thereafter, the routine proceeds to Step S1113 where a change in the time during which the control of engaging or disengaging the clutches that are to be continuously engaged or disengaged is continued (that is, a specified lapse of time) is set. Then, the routine proceeds to Step S1114 where a change in the gradient of the control of increasing hydraulic pressure or the control of decreasing hydraulic pressure for a clutch that is to be continuously engaged or disengaged is set and the present routine is finished.

[Routine for Setting Performance of Shift Cancellation]

Figure 25:
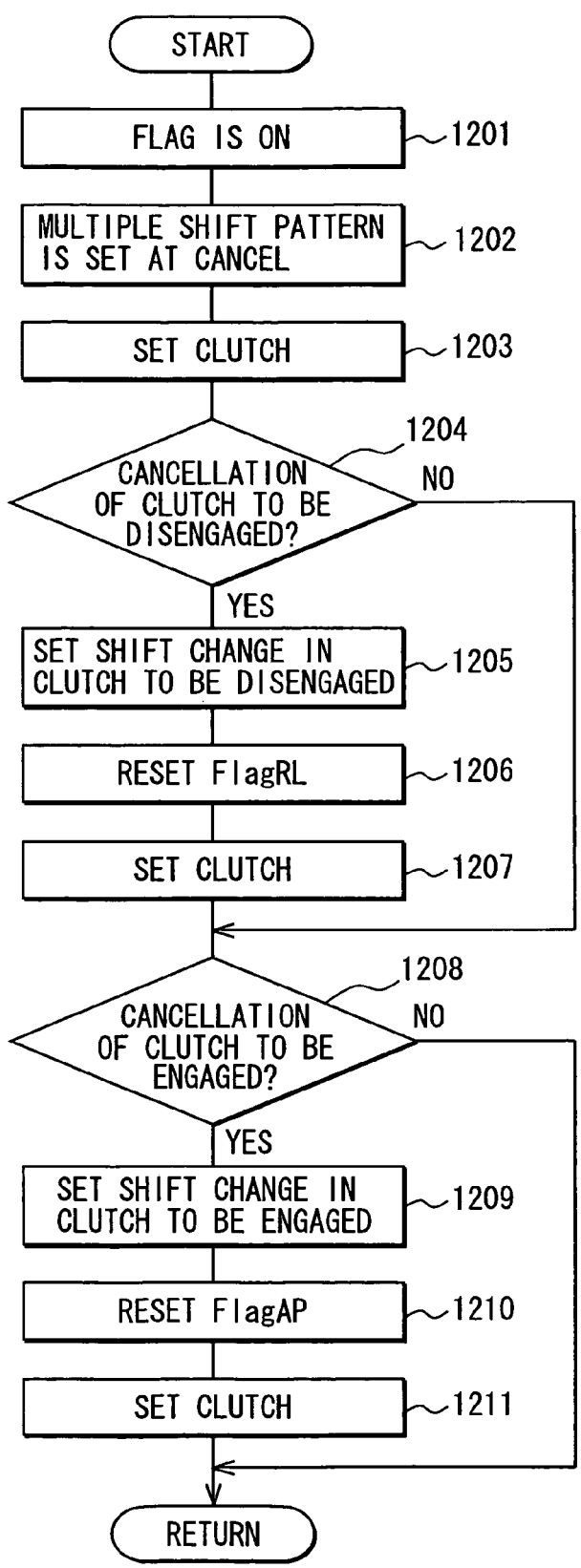
FIG. 25 is a flow chart showing the flow of processing of a routine for setting shift cancellation performance.

A routine for setting performance of shift cancellation, which is described in FIG. 25, is a sub-routine started in Step S310 of the routine for determining and setting a multiple shift, which has been described in FIG. 10. When this routine is started, first, the multiple shift performance flag is set (ON) in Step S1201 and then the routine proceeds to Step S1202 where the multiple shift pattern is set at "shift cancellation." Then, the routine proceeds to Step S1203 where a clutch to be cancelled is set.

Thereafter, the routine proceeds to Step S1204 where it is determined whether or not there is cancellation of a clutch that is to be disengaged. When there is cancellation of a clutch that is to be disengaged, the routine proceeds to Step S1205 where a change in a clutch that is to be disengaged is set. Then, the proceeds to Step S1206 where the control step flag FlagRL of the clutch that is to be disengaged is reset. Then, the routine proceeds to Step S1207 where a clutch, to which the control of increasing hydraulic pressure for engaging is performed at the time of shift cancellation, is set. When there is not cancellation of a clutch that is to be disengaged, the processing in these Steps S1205 to S1207 is not performed.

Thereafter, the routine proceeds to Step S1208 where it is determined whether or not there is cancellation of a clutch that is to be engaged. When there is cancellation of a clutch that is to be engaged, the routine proceeds to Step S1209 where a change in the clutch that is to be engaged is set. Then, the routine proceeds to Step S1210 where the control step flag FlagAP of the clutch that is to be engaged is reset. Then, the routine proceeds to Step S1211 where a clutch, to which the control of decreasing hydraulic pressure for disengaging is performed at the time of shift cancellation, is set. When there is not cancellation of a clutch that is to be engaged, the processings in Steps S1208 to S1211 are not performed.

[Routine for Setting Continuous Performance of Shift Preparation]

Figure 26:
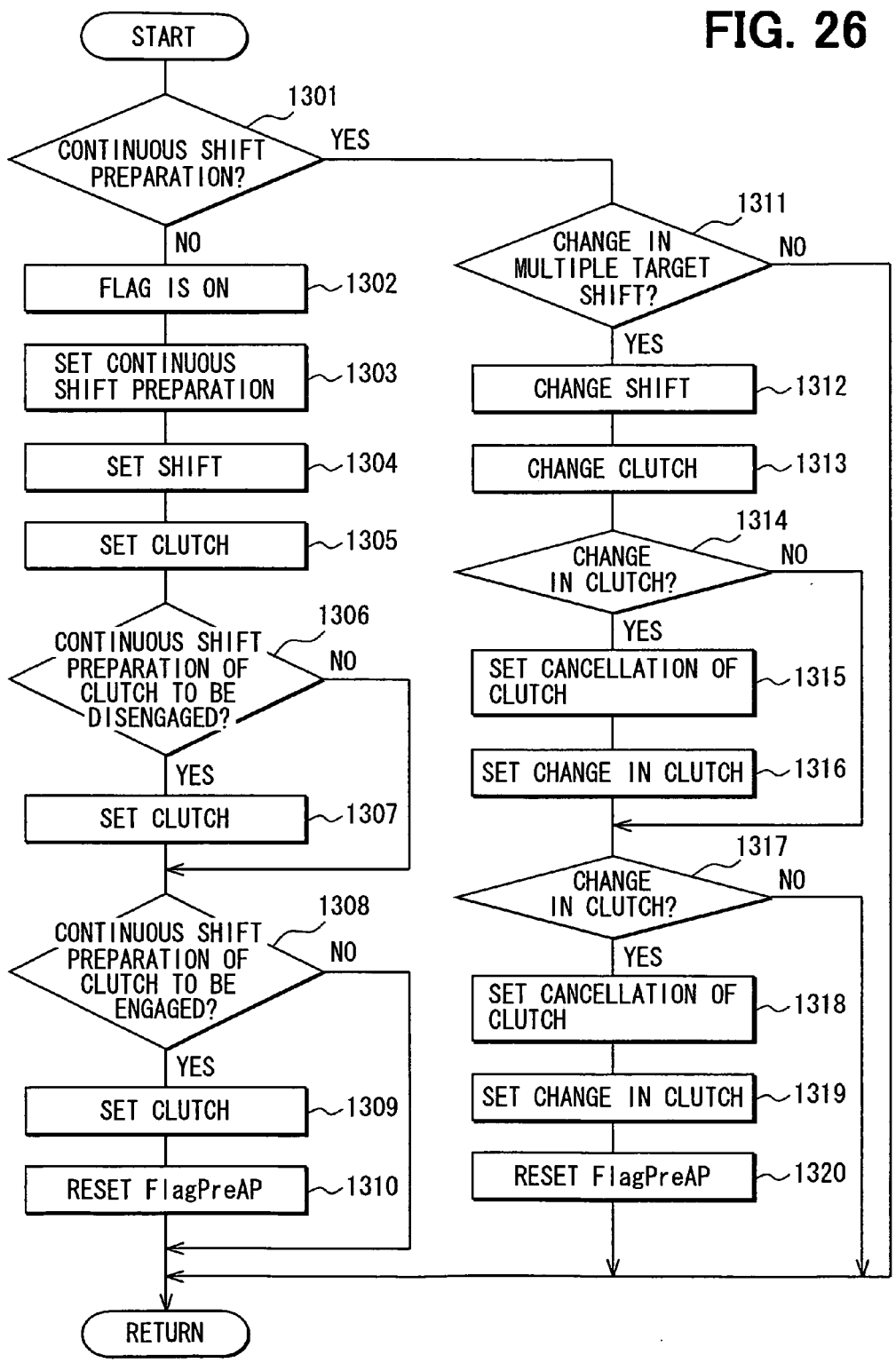
FIG. 26 is a flow chart showing the flow of processing of a routine for setting continuous shift preparation performance.

A routine for setting continuous performance of shift preparation, which is described in FIG. 26, is a sub-routine started in Step S312 of the routine for determining and setting a multiple shift, which has been described in FIG. 10. When this routine is started, first, it is determined in Step S1301 whether or not continuous shift preparation is being performed. Then, when continuous shift preparation is not being performed, the routine proceeds to Step S1302 where the multiple shift performance flag is set (ON) and the multiple shift pattern is set at "continuous shift preparation." Then, the routine proceeds to Step S1304 where the kind of a shift, in which continuous shift preparation is performed, is set. Then, the routine proceeds to the next Step S1305 where a clutch for which continuous shift is prepared is set.

Thereafter, the routine proceeds to Step S1306 where it is determined whether or not there is continuous shift preparation of a clutch that is to be disengaged. When there is the continuous shift preparation of a clutch that is to be disengaged, the routine proceeds to Step S1307 where a clutch, to which the control of holding hydraulic pressure for disengaging at the time of continuous shift preparation is performed, is set. When there is not continuous shift preparation of a clutch that is to be disengaged, the processing in this Step S1307 is not performed.

Thereafter, the routine proceeds to Step S1308 where it is determined whether or not there is continuous shift preparation of a clutch that is to be engaged. When there is continuous shift preparation of a clutch that is to be engaged, the routine proceeds to Step S1309 where a clutch, to which the control of holding hydraulic pressure for engaging is performed at the time of continuous shift preparation, is set. Then, the routine proceeds to Step S1310 where the control step flag FlagPreAP of a clutch that is to be engaged is reset and the present routine is finished. When there is not continuous shift preparation of a clutch that is to be engaged, the processings in Steps S1309 to S1310 are not performed.

Meanwhile, when it is determined in Step S1301 that continuous shift preparation is in process, the routine proceeds to Step S1311 where it is determined whether or not there is a change in the multiple target shift step. When it is determined that there is not a change in the multiple target shift step, the present routine is finished without performing the subsequent processing.

When it is determined in Step S1311 that there is a change in the multiple target shift step, the routine proceeds to Step S1312 where the kind of a shift, in which continuous shift preparation is performed, is changed and in the next Step S1313, a clutch for which continuous shift preparation is performed is changed. Then, the routine proceeds to Step S1314 where it is determined whether or not there is a change in the clutch that is to be disengaged at the time of the continuous shift preparation. When it is determined that there is a change in the clutch that is to be disengaged at the time of the continuous shift preparation, the routine proceeds to Step S1315 where cancellation of a clutch, which is in process of being subjected to the control of holding hydraulic pressure for disengaging at the time of the continuous shift preparation, is set. Then, the routine proceeds to Step S1316 where a change in the clutch, which is subjected to the control of holding hydraulic pressure for disengaging at the time of the continuous shift preparation, is set. When it is determined that there is not a change in the clutch that is to be disengaged at the time of the continuous shift preparation, the processing in these Steps S1315 and S1316 is not performed.

Thereafter, the routine proceeds to Step S1317 where it is determined whether or not there is a change in the clutch that is to be engaged at the time of the continuous shift preparation. When it is determined that there is a change in the clutch that is to be engaged at the time of the continuous shift preparation, the routine proceeds to Step S1318 where cancellation of a clutch, which is in process of being subjected to the control of holding hydraulic pressure for engaging at the time of the continuous shift preparation, is set. Then, the routine proceeds to Step S1319 where a change in the clutch, which is subjected to the control of holding hydraulic pressure for engaging at the time of the continuous shift preparation, is set and in the next Step S1320, the control step flag FlagPreAP is reset and the present routine is finished. When it is determined that there is not a change in the clutch that is to be engaged at the time of the continuous shift preparation, the processing in these Steps S1318 to S1320 is not performed.

In the multiple shift control of the present embodiment described above, when a request to switch to a shift to a new third shift step is made during performing a shift from a first shift step to a second shift step, a method for performing a shift to the third shift step is changed according to a combination pattern of engagement and disengagement (engagement pattern) of the respective friction engaging components (the respective clutches C0, C1, and C2, and the respective brakes B0, B1, B2, and B3) in the steady state of the third shift step. Hence, when the request to switch to the shift to the new third shift step is made during performing the shift from the first shift step to the second shift step, it is possible to select an appropriate shift method in consideration of the relationship between the engagement pattern of the respective friction engaging components at that time and the engagement pattern of the new third shift step and to perform a multiple shift. Therefore, it is possible to prevent a shift shock caused by the multiple shift and at the same time to perform the multiple shift with excellent responsivity.

Needless to say, the present invention can be applied to not only a five-speed automatic transmission but also a four-speed or less or six-speed or more automatic transmission.

What is claimed is:

1. A control device of an automatic transmission, including an input shaft to which a rotational force is transmitted from a driving source, a transmission mechanism that varies rotation of the input shaft and transmits the rotation to an output shaft, and a plurality of friction engaging components mounted in a plurality of shift steps of the transmission mechanism, and selectively switching between engagement and disengagement of the friction engaging components to switch the shift step of the transmission mechanism by setting a target shift step according to a request to switch the shift step and by individually controlling hydraulic pressures applied to the plurality of friction engaging components, the control device comprising:

multiple shift controlling means that switches a state of control of the hydraulic pressures applied to the respective friction engaging components when a request to switch a shift to a new third shift step is made during performing a shift from a first shift step to a second shift step to thereby perform a multiple shift, wherein the multiple shift controlling means changes a method of performing the shift to the third shift step according to an engagement pattern which represents a combination pattern of engagement and disengagement of the respective friction engaging components in a steady state of the third shift step.

2. The control device of an automatic transmission, according to claim 1, wherein when the friction engaging components exist that are continuously engaged or disengaged at the time of a shift from the second shift step to the third shift step, the multiple shift controlling means continues control of engaging or disengaging the friction engaging components whereas starts control of engaging or disengaging the other friction engaging components, which are changed in a state of engagement or disengagement, so as to make the other friction engaging components respond to the engagement pattern of the third shift step to thereby move to the shift from the second shift step to the third shift step.

3. The control device of an automatic transmission, according to claim 1, wherein when all of the friction engaging components that are to be switched between engagement and disengagement at the time of the shift from the first shift step to the second shift step are different from the friction engaging components that are to be switched between engagement and disengagement at the time of the shift from the second shift step to the third shift step, the multiple shift controlling means continues control of engaging or disengaging the friction engaging components to achieve an engagement pattern of the second shift step and at the same time prepares hydraulic pressures applied to the friction engaging components relating to the engagement pattern of the third shift step so as to bring about a state just before being able to achieve engagement and disengagement of the friction engaging components before finishing the shift to the second shift step.

4. The control device of an automatic transmission, according to claims 1, wherein when the engagement pattern of the third shift step is the same as an engagement pattern of the first shift step, the multiple shift controlling means disengages the friction engaging component that is to be switched to being engaged and engages the friction engaging component that is to be switched to being disengaged during performing the shift from the first shift step to the second shift step to thereby cancel the shift to the second shift step.

5. The control device of an automatic transmission, according to claim 1, wherein the multiple shift controlling means is provided with determination means for determining whether or not control of hydraulic pressures for the respective friction engaging components that are in process of the multiple shift is allowed.

6. The control device of an automatic transmission, according to claim 5, wherein when the request to switch to the shift to the third shift step is detected, the determination means determines whether or not a first prohibiting condition holds by whether or not temperature of hydraulic oil of the automatic transmission is lower than a first previously specified value or by whether or not a degree of progress in the shift to the second shift step reaches a specified value, and when the determination means determines that the first prohibiting condition holds, the multiple shift controlling means does not perform the shift to the third shift step and/or does not cancel the shift to the second shift step but prepares hydraulic pressures applied to the friction engaging components relating to the engagement pattern of the third shift step in such a way as to bring about a state just before being able to achieve engagement and disengagement of the friction engaging components before finishing the shift to the second shift step.

7. The control device of an automatic transmission, according to claim 5, wherein when the request to switch to the shift to the third shift step is detected, the determination means determines whether or not a second prohibiting condition holds by whether or not temperature of hydraulic oil of the automatic transmission is lower than a second specified value that is set at a value lower than the first specified value, and wherein when the determination means determines that the second prohibiting condition holds, the multiple shift controlling means does not perform the shift to the third shift step until the shift to the second shift step is finished.

* * * * *